US008081678B2

(12) United States Patent
Lu et al.

(10) Patent No.: US 8,081,678 B2
(45) Date of Patent: Dec. 20, 2011

(54) PICTURE CODING METHOD AND PICTURE DECODING METHOD

(75) Inventors: Jiuhuai Lu, Palos Verdes Peninsula, CA (US); Yoshiichiro Kashiwagi, Arcadia, CA (US); Masayuki Kozuka, Neyagawa (JP); Shinya Kadono, Nishinomiya (JP)

(73) Assignee: Panasonic Corporation, Osaka (JP)

( * ) Notice: Subject to any disclaimer, the term of this patent is extended or adjusted under 35 U.S.C. 154(b) by 1610 days.

(21) Appl. No.: 10/546,409

(22) PCT Filed: Feb. 18, 2004

(86) PCT No.: PCT/US2004/004829
§ 371 (c)(1),
(2), (4) Date: Aug. 19, 2005

(87) PCT Pub. No.: WO2004/077810
PCT Pub. Date: Sep. 10, 2004

(65) Prior Publication Data
US 2006/0159165 A1 Jul. 20, 2006

(51) Int. Cl.
*H04N 7/12* (2006.01)
*H04N 11/02* (2006.01)
*H04N 11/04* (2006.01)
*H04B 1/66* (2006.01)

(52) U.S. Cl. ................................. 375/240.03
(58) Field of Classification Search .............. 375/240.03
See application file for complete search history.

(56) References Cited

U.S. PATENT DOCUMENTS

| 5,021,891 A | 6/1991 | Lee |
| 5,262,854 A | 11/1993 | Ng |
| 5,355,167 A | 10/1994 | Juri |
| 5,576,767 A * | 11/1996 | Lee et al. ................. 375/240.14 |
| 5,818,532 A | 10/1998 | Malladi et al. |
| RE36,380 E | 11/1999 | Juri |
| 5,986,710 A * | 11/1999 | Kim et al. ................. 375/240.2 |
| 6,668,095 B2 * | 12/2003 | Rackett ......................... 382/250 |

(Continued)

FOREIGN PATENT DOCUMENTS
EP    0 509 576 A2    10/1992
(Continued)

OTHER PUBLICATIONS

Wein, M.: "ABT Coding for Higher Resolution Video", Joint Video Team of ISO/IEC MPEG & ITU-T VCEG, $2^{nd}$ Meeting, Geneva, CH, Jan. 29-Feb. 1, 2002, pp. 1-30.

(Continued)

*Primary Examiner* — Nhon Diep

(57) ABSTRACT

The picture coding method of the present invention is a picture coding method for coding a picture on a block-by-block basis, comprising: a selection step of selecting one of at least two sizes as a size of a block on which orthogonal transformation should be performed; a transformation step of performing orthogonal transformation on a block having the selected size; a coding step of coding data of said block obtained in the transformation step; and a generation step of generating a coded stream that includes the coded data of the block and size information concerning the size selected in the selection step, wherein the size information indicates whether or not the size is a fixed block size within a predetermined section in the coded stream, and the predetermined section is one of a sequence, a group of pictures, a picture, a slice, and a macroblock.

3 Claims, 21 Drawing Sheets

U.S. PATENT DOCUMENTS

| | | | |
|---|---|---|---|
| 7,397,857 B2 * | 7/2008 | Romanowski et al. | 375/240.16 |
| 7,688,894 B2 * | 3/2010 | Liang et al. | 375/240.18 |
| 2004/0062309 A1 | 4/2004 | Romanowski et al. | |

FOREIGN PATENT DOCUMENTS

| | | |
|---|---|---|
| JP | 10-178639 | 6/1998 |
| KR | 1995-0004117 | 4/1995 |
| WO | 97/15146 | 4/1997 |
| WO | WO 01/86961 | 11/2001 |

OTHER PUBLICATIONS

Wein, Mathias et al., "Simplified Adaptive Block Transforms"; Joint Video Team (JVT) of ISO/IEC MPEG & ITU-T VCEG (ISO/IEC JTC1/SC29/WG11 and ITU-T SG16 Q6), 15$^{th}$ Meeting Pattaya, Thailand, Dec. 4-6, 2001, No. VCEG-O30, Dec. 4, 2001, pp. 1-12.

Wein, Mathias et al., "Adaptive Block Transforms", ITU-T SG16 Q.6, Video Coding Experts Group (VCEG), 13$^{th}$ Meeting, Austin, TX, USA Apr. 2-4, 2001, p. 1-7.

Joint Video Team, 4th Meeting, Klagenfurt, Austria Jul. 22-26, 2002; ITU-T Rec. H.264; ISO/IEC 14496-10 AVC; pp. i-xv, 1-191.

Korean Office Action dated Apr. 29, 2010, 5 pages, for KR 10-2005-7012100, No Translation.

Bracamonte, Javier et al.; "Adaptive Block-Size Transform Coding for Image Compression"; 1997; Acoustics, Speech and Signal Processing, ICASSP-97, IEEE International Conference on Munich, Germany Apr. 21-24, 1997, Los Alamitos, CA, USA, IEEE Comput. Soc, US, pp. 2721-2724.

Wiegand, T.; "Text of Final Committee Draft of Joint Video Specification(ITU-T Rec. H. 264/ISO/IEC 14496-10 AVC) MPEG02/N4920,"; ISO/IEC JTC1/SC29/WG11 MPEG02/N4920, Klagenfurt, AT, Jul. 2002; pp. 16, 33-35.

* cited by examiner

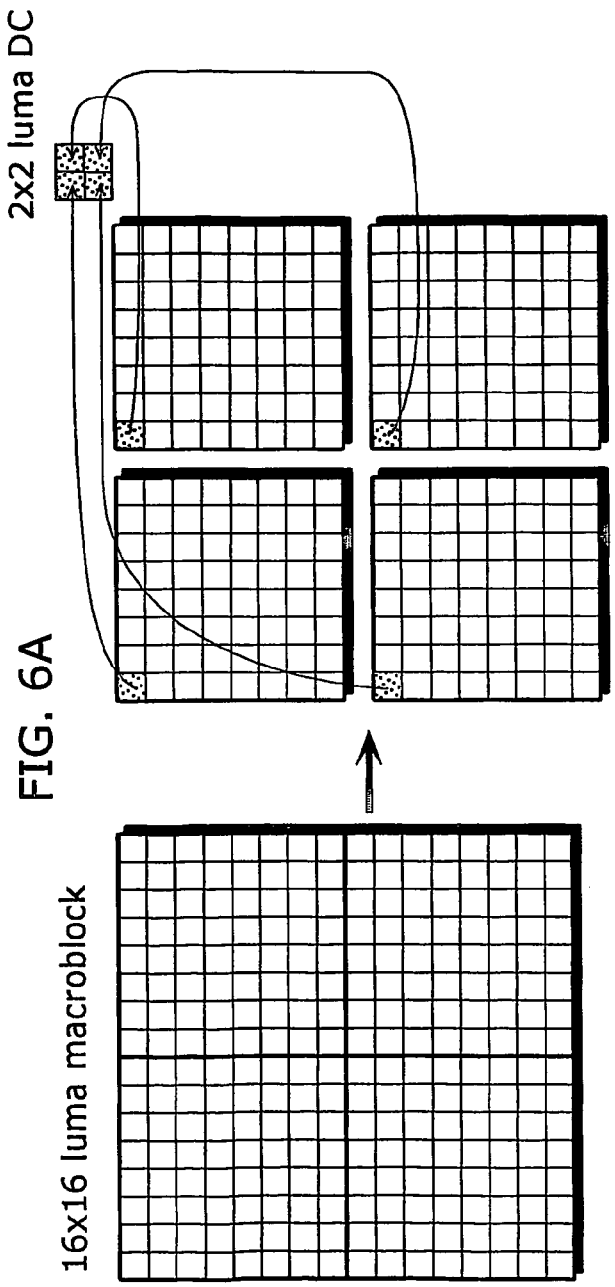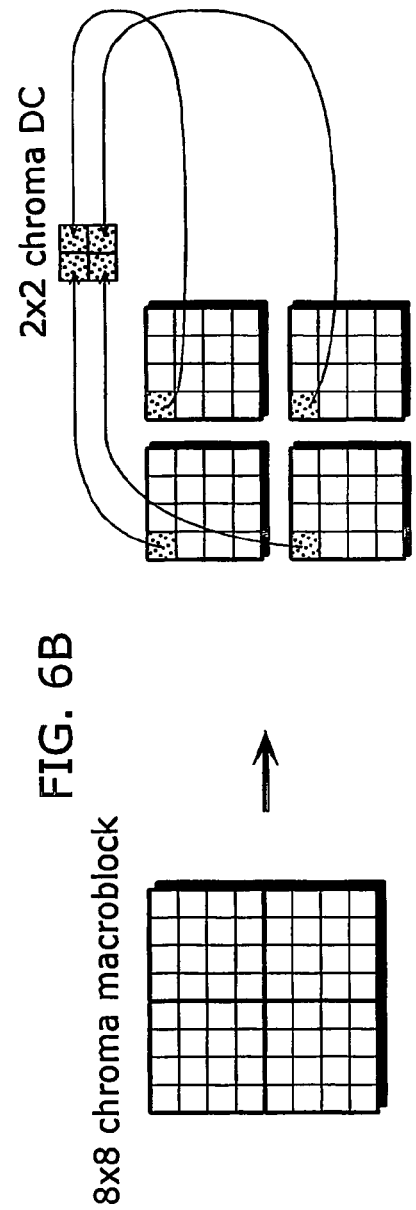

FIG. 7B

| $W4_{0,0}$ | $W4_{0,1}$ | $W4_{0,2}$ | $W4_{0,3}$ |
|---|---|---|---|
| $W4_{1,0}$ | $W4_{1,1}$ | $W4_{1,2}$ | $W4_{1,3}$ |
| $W4_{2,0}$ | $W4_{2,1}$ | $W4_{2,2}$ | $W4_{2,3}$ |
| $W4_{3,0}$ | $W4_{3,1}$ | $W4_{3,3}$ | $W4_{3,3}$ |

FIG. 7A

| $W8_{0,0}$ | $W8_{0,1}$ | $W8_{0,2}$ | --- | $W8_{0,7}$ |
|---|---|---|---|---|
| $W8_{1,0}$ | $W8_{1,1}$ | $W8_{1,2}$ | --- | $W8_{1,7}$ |
| $W8_{2,0}$ | $W8_{2,1}$ | $W8_{2,2}$ | --- | $W8_{2,7}$ |
| --- | --- | --- | --- | --- |
| $W8_{7,0}$ | $W8_{7,1}$ | $W8_{7,2}$ | --- | $W8_{7,7}$ |

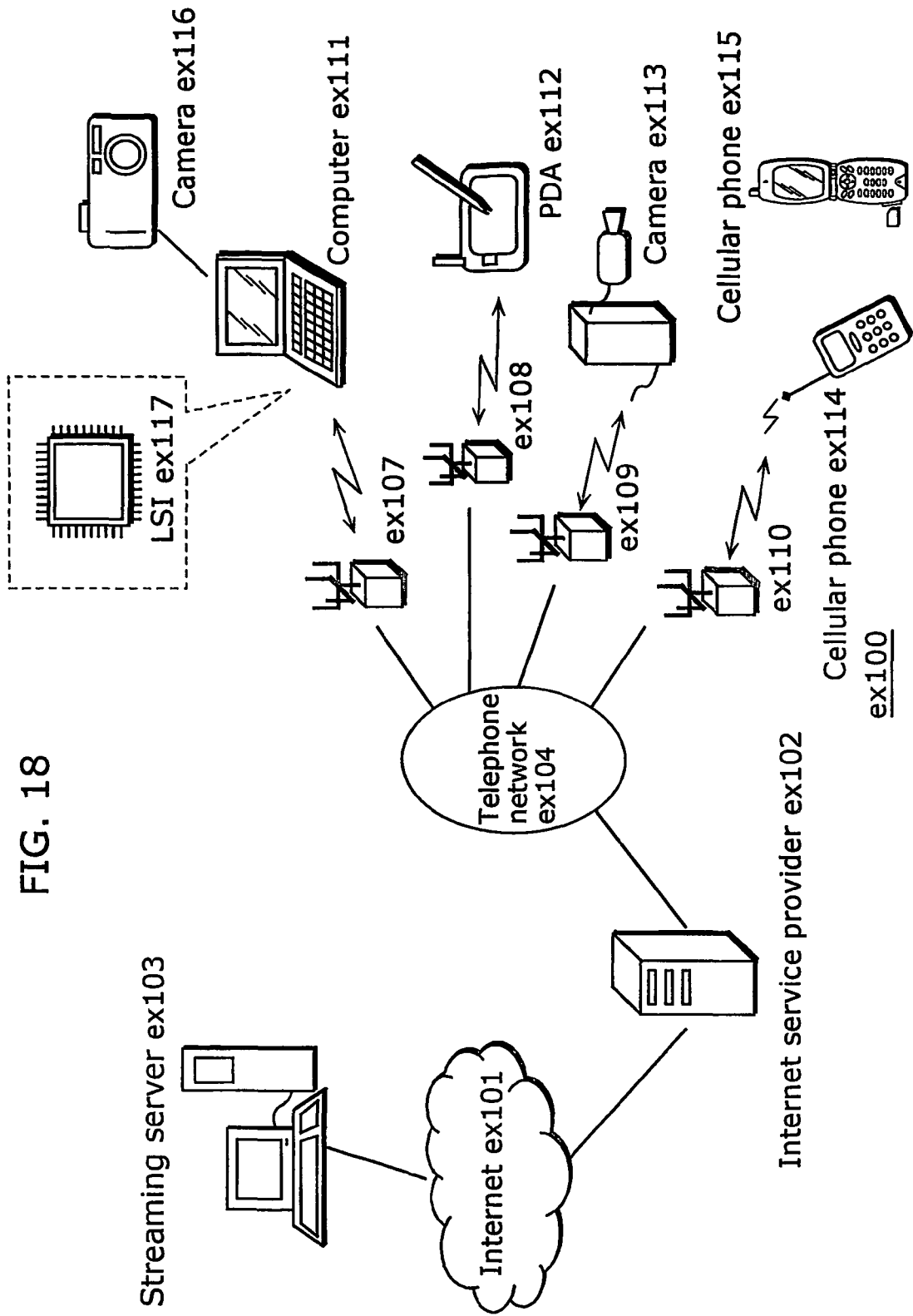

PICTURE CODING METHOD AND PICTURE DECODING METHOD

TECHNICAL FIELD

The present invention relates to a picture coding method for efficiently compressing a moving picture and a picture decoding method for decoding such compressed moving picture, as well as a picture coding apparatus and a picture decoding apparatus thereof, and more particularly to an improved technique for achieving high compression ratio.

BACKGROUND ART

In the age of multimedia that integrally handles audio, video and pixel values of others, existing information media, i.e. newspaper, magazine, television, radio, telephone and other means through which information is conveyed to people, have recently come to be included in the scope of multimedia. In general, multimedia refers to representing not only characters, but also graphics, voices, and especially pictures and the like together in association with one another. However, in order to include the aforementioned existing information media in the scope of multimedia, it becomes absolutely necessary to represent such information in digital form.

However, when calculating the amount of information contained in each of the aforementioned information media as the amount of digital information, while the amount of information per character is 1~2 bytes in the case of characters, the amount of information to be required is 64 Kbits or over per second in the case of voices (telephone quality), and 100 Mbits or over per second in the case of a moving picture (current television reception quality). Thus, it is not realistic for the aforementioned information media to handle such an enormous amount of information as it is in digital form. For example, although video phones are already in the actual use by use of Integrated Services Digital Network (ISDN) that offers a transmission speed of 64 Kbit/s~1.5 Mbit/s, it is not possible to transmit video of televisions and cameras directly through ISDN.

Against this backdrop, information compression techniques have become required, and moving picture compression techniques compliant with H.261 and H.263 standards recommended by ITU-T (International Telecommunication Union-Telecommunication Standardization Sector) are employed for video phones, for example. Moreover, according to an information compression technique compliant with the MPEG-1 standard, it is possible to store picture information into an ordinary music CD (compact disc) together with audio information.

Here, MPEG (Moving Picture Experts Group) is an international standard on compression of moving picture signals standardized by ISO/IEC (International Organization for Standardization/International Electrotechnical Commission), and MPEG-1 is a standard for compressing television signal information approximately into one hundredth so that a moving picture signal can be transmitted at a rate of 1.5 Mbit/s. Furthermore, since a transmission speed achieved by the MPEG-1 standard is a middle-quality speed of about 1.5 Mbit/s, MPEG-2, which was standardized with a view to satisfying requirements for further improved picture quality, allows data transmission equivalent in quality to television broadcasting through which a moving picture signal is transmitted at a rate of 2~15 Mbit/s. Moreover, MPEG-4 was standardized by the working group (ISO/IEC JTC1/SC29/WG11) which promoted the standardization of MPEG-1 and MPEG-2. MPEG-4, which provides a higher compression ratio than that of MPEG-1 and MPEG-2 and which enables an object-based coding/decoding/operation, is capable of providing a new functionality required in this age of multimedia. At the beginning stage of standardization, MPEG-4 aimed at providing a low bit rate coding method, but it has been extended as a standard supporting more general coding that handles interlaced images as well as high bit rate coding. Currently, an effort has been made jointly by ISO/IEC and ITU-T for standardizing MPEG-4 AVC and ITU-T H.264 as picture coding methods of the next generation that offer a higher compression ratio.

In general, in coding of a moving picture, the amount of information is compressed by reducing redundancies in temporal and spatial directions. Therefore, in inter picture prediction coding aiming at reducing temporal redundancies, motion estimation and the generation of a predicative image are carried out on a block-by-block basis with reference to forward or backward picture(s), and coding is then performed on the differential value between the obtained predictive image and an image in the current picture to be coded. Here, "picture" is a term denoting one image. In the case of a progressive image, "Picture" means a frame, whereas it means a frame or fields in the case of an interlaced image. Here, "interlaced image" is an image of a frame composed of two fields which are separated in capture time. In coding and decoding of an interlaced image, it is possible to handle one frame as (1) a frame as it is, (2) two fields, or (3) a frame structure or a field structure on a per-block basis within the frame.

A picture to be coded using intra picture prediction without reference to any pictures shall be referred to as an I picture. A picture to be coded using inter picture prediction with reference to only one picture shall be referred to as a P picture. And, a picture to be coded using inter picture prediction with reference to two pictures at the same time shall be referred to as a B picture. It is possible for a B picture to refer to two pictures which can be arbitrarily combined from forward/backward pictures in display order. Reference images (reference pictures) can be determined for each block serving as a basic coding/decoding unit. Distinction shall be made between such reference pictures by calling a reference picture to be described earlier in a coded bitstream as a first reference picture, and by calling a reference picture to be described later in the bitstream as a second reference picture. Note that as a condition for coding and decoding these types of pictures, pictures used for reference are required to be already coded and decoded.

P pictures and B pictures are coded using motion compensated inter picture prediction. Coding by use of motion compensated inter picture prediction is a coding method that employs motion compensation in inter picture prediction coding. Unlike a method for performing prediction simply based on pixel values in a reference picture, motion estimation is a technique capable of improving prediction accuracy as well as reducing the amount of data by estimating the amount of motion (hereinafter referred to as "motion vector") of each part within a picture and further by performing prediction in consideration of such amount of motion. For example, it is possible to reduce the amount of data through motion compensation by estimating motion vectors of the current picture to be coded and then by coding prediction residuals between prediction values obtained by shifting only the amount of the respective motion vectors and the current picture to be coded. In this technique, motion vectors are also recorded or transmitted in coded form, since motion vector information is required at the time of decoding.

Motion vectors are estimated on a per-macroblock basis. More specifically, a macroblock shall be previously fixed in the current picture to be coded, so as to estimate motion vectors by finding the position of the most similar reference block of such macroblock within the search area in a reference picture.

FIG. 1 is a diagram illustrating an example data structure of a bitstream. As FIG. 1 shows, the bitstream has a hierarchical structure such as below. The bitstream (Stream) is formed of more than one group of pictures (GOP). By using GOPs as basic coding units, it becomes possible to edit a moving picture as well as to make a random access. Each GOP is made up of plural pictures, each of which is one of I picture, P picture, and B picture. Each picture is further made up of plural slices. Each slice, which is a strip-shaped area within each picture, is made up of plural macroblocks. Moreover, each stream, GOP, picture, and slice includes a synchronization signal (sync) for indicating the ending point of each unit and a header (header) which is data common to said each unit.

Note that when data is carried not in a bitstream that is a sequence of streams, but in a packet and the like that is a piecemeal unit, the header and the data portion, which is the other part than the header, may be carried separately. In such case, the header and the data portion shall not be incorporated into the same bitstream, as shown in FIG. 1. In the case of a packet, however, even when the header and the data portion are not transmitted contiguously, it is simply that the header corresponding to the data portion is carried in another packet. Therefore, even when the header and the data portion are not incorporated into the same bitstream, the concept of a coded bitstream described with reference to FIG. 1 is also applicable to packets.

FIG. 2 is a block diagram showing the construction of an existing picture coding apparatus. In this drawing, a picture coding apparatus 1 is an apparatus for performing compression coding on an input picture signal Vin, so as to output a coded picture signal Str which has been coded into a bitstream by performing variable length coding and the like. Such picture coding apparatus 1 is comprised of a motion estimation unit ME, a motion compensation unit MC, a subtraction unit Sub, an orthogonal transformation unit T, a quantization unit Q, an inverse quantization unit IQ, an inverse orthogonal transformation unit IT, an addition unit Add, a picture memory PicMem, a switch SW, and a variable length coding unit VLC.

The picture signal Vin is inputted to the subtraction unit Sub and the motion estimation unit ME. The subtraction unit Sub calculates, as a prediction error, a difference between each image in the input picture signal Vin and each predictive image on a block-by-block basis, and outputs the calculated prediction error to the orthogonal transformation unit T. The orthogonal transformation unit T performs orthogonal transformation on the prediction error to transform it into frequency coefficients, and outputs such frequency coefficients to the quantization unit Q. The quantization unit Q quantizes such inputted frequency coefficients, and outputs the quantized values Qcoef to the variable length coding unit VLC.

The inverse quantization unit IQ performs inverse quantization on the quantized values Qcoef so as to turn them into the frequency coefficients, and outputs such frequency coefficients to the inverse orthogonal transformation unit IT. The inverse orthogonal transformation unit IT performs inverse frequency transformation on the frequency coefficients so as to transform them into a prediction error, and outputs such prediction error to the addition unit Add. The addition unit Add adds each prediction error and each predictive image outputted from the motion estimation unit MC, so as to form a decoded image. The switch SW turns to ON when it is indicated that such decoded image should be stored, and such decoded image is to be stored into the picture memory PicMem.

Meanwhile, the motion estimation unit ME, which receives the picture signal Vin on a macroblock basis, detects an image area closest to such input image signal Vin from the among decoded pictures stored in the picture memory PicMem, and determines motion vector(s) MV indicating the position of such area. Motion vectors are estimated for each block, which is obtained by further dividing a macroblock. When this is done, it is possible to use more than one picture as reference pictures. A reference picture used for estimating a motion vector shall be identified by an identification number (reference index Index). The picture numbers of the respective pictures stored in the picture memory PicMem are associated with reference indices Index.

The motion compensation unit MC reads out an optimum picture as a predictive picture from among the decoded pictures stored in the picture memory PicMem, based on the motion vectors detected in the above processing and the reference indices Index.

The variable length coding unit VLC performs variable length coding on each of the quantized values Qcoef, reference indices Index, and motion vectors MV so as to output them as a coded stream Str.

FIG. 3 is a block diagram showing the construction of an existing picture decoding apparatus. In this drawing, units that operate in the same manner as that of the units in the picture coding apparatus shown in FIG. 2 are assigned the same numbers, and descriptions thereof are omitted.

The variable length decoding unit VLD decodes the coded stream Str into quantized values Qcoef, reference indices Index, and motion vectors MV. Those quantized values Qcoef, reference indices Index, and motion vectors MV are inputted into the picture memory PicMem, the motion compensation unit MC, and the inverse quantization unit IQ, where decoding processing is performed. Processing to be performed in such decoding processing is equivalent to that performed in the existing picture coding apparatus shown in FIG. 2.

(Non-patent document) ITU-T Rec. H.264|ISO/IEC 14496-10 AVC Joint Final Committee Draft of Joint Video Specification (2002-8-10).

However, according to the existing picture coding apparatus, it is difficult to use a high-compression ratio to all images containing many pixels and to all images of a variety of contents. It is thus required for such existing picture coding apparatus to be capable of improving image quality as well as offering a high compression ratio.

To be more specific, the existing picture coding apparatus uses a fixed sized block as a unit of performing orthogonal transformation (orthogonal transformation size). This makes it difficult to achieve a high compression ratio to a moving picture signal including pictures with a variety of contents such as high- and low-resolution pictures as well as pictures with many and few variations in brightness and colors. The reason is that an orthogonal transformation size is 8×8 pixels in the case of MPEG-1, MPEG-2, and MPEG-4, for example, whereas an orthogonal transformation size is 4×4 pixels in the case of MPEG-4 AVC, i.e. ITU-T H.264. On that point, since pixels are more strongly correlated with one another and the density among pixels of a display device (e.g. CRT) is higher compared with a low-resolution image, it is deemed desirable to use a larger orthogonal transformation size for a high-resolution image (e.g. HDTV). Moreover, it is also desirable in many cases that a larger orthogonal transformation size be used for content with a smaller number of high frequency components, whereas a smaller orthogonal transformation size be used for content with a larger number of high frequency components.

DISCLOSURE OF INVENTION

The present invention has been conceived in view of the above problems, and it is an object of the present invention to provide a picture coding method, a picture decoding method, a picture coding apparatus, a picture decoding apparatus, and a program thereof for performing coding at a high compression ratio, regardless of whether the resolution of pictures as well as the bit rate is high or low and whether there are many variations in brightness and colors.

In order to achieve the above object, the picture coding method according to the present invention is a picture coding method for coding a picture on a block-by-block basis, comprising: a selection step of selecting one of at least two sizes as a size of a block on which orthogonal transformation should be performed; a transformation step of performing orthogonal transformation on a block having the selected size; a coding step of coding data of said block obtained in the transformation step; and a generation step of generating a coded stream that includes the coded data of the block and size information concerning the size selected in the selection step.

With this construction, since an orthogonal transformation size is selected, it is possible to perform orthogonal transformation in an appropriate manner according to whether the resolution is high or low, whether the bit rate is high or low, and whether there are many variations in brightness and colors. Accordingly, it becomes possible to compress all sorts of pictures at a higher compression ratio.

Here, the size information may indicate whether or not the size is a fixed block size within a predetermined section in the coded stream, and the predetermined section may be one of a sequence, a group of pictures, a picture, a slice, and a macroblock.

With the above construction, it becomes possible to indicate whether or not a block size for orthogonal transformation is fixed in the coded stream for every predetermined section described above.

Here, the size information may indicate whether the size selected in the selection step is one of a first size and a second size which is other than said first size, and the first size may be a size of a block made up of 4 by 4 pixels, and the second size may be a size of a block made up of 8 by 8 pixels.

With the above construction, it becomes possible to improve a compression ratio by selectively switching between the first size for a 4×4 pixel block and the second size for an 8×8 pixel block.

Here, in the transformation step, the data of the orthogonally-transformed block may be quantized by use of a weighting matrix corresponding to the size of said block.

With the above construction, a weighting matrix is used to change the size of a quantization step on a frequency component basis at the time of quantizing orthogonally-transformed frequency components by means of weighting. By using a weighting matrix that corresponds to each of the first size and second size, it becomes possible to further improve a coding efficiency.

Here, in the coding step, the weighting matrix corresponding to the second size may be coded, and in the generation step, said coded weighting matrix may be incorporated into the coded stream.

With the above construction, it becomes possible to set the weighting matrix corresponding to the first size as the default weighting matrix in both the picture coding and decoding methods, so as to enable the weighting matrix corresponding to the second size to be selectively used in the picture coding method.

Here, in the selection step, one of the first size and the second size may be selected according to at least one of the following: a bit rate of the coded stream; a resolution of the picture; and an indication from outside.

With the above construction, it becomes possible to make a flexible selection of either the first size or the second size according to any one of the bit rate of the coded stream, the resolution of the picture, and an indication from outside.

As described above, according to the picture coding method and the picture decoding method of the present invention, it becomes possible to efficiently compress any sorts of pictures regardless of whether the picture resolution is high or low, whether the bit rate is high or low, and whether there are many variations in brightness and colors.

Furthermore, it is possible to achieve the above-described effects through the picture coding apparatus, picture decoding apparatus, and program thereof according to the present invention.

As further information about the technical background to this application, U.S. Provisional Patent Application Ser. No. 60/449,135 filed on Feb. 21, 2003 is incorporated herein by reference.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 6A is a block diagram showing a 16×16 pixel luma macroblock and an orthogonal transformation block thereof;

FIG. 6B is a block diagram showing an 8×8 pixel chroma macroblock and an orthogonal transformation block thereof;

FIG. 7A is a diagram showing a weighting matrix for an 8×8 pixel block;

FIG. 7B is a diagram showing a weighting matrix for a 4×4 pixel block;

FIG. 18 is a block diagram showing an overall configuration of a content supply system;

BEST MODE FOR CARRYING OUT THE INVENTION

The following describes an embodiment of the present invention with reference to FIGS. 4~21.

<Picture Coding Apparatus>

Figure 4:
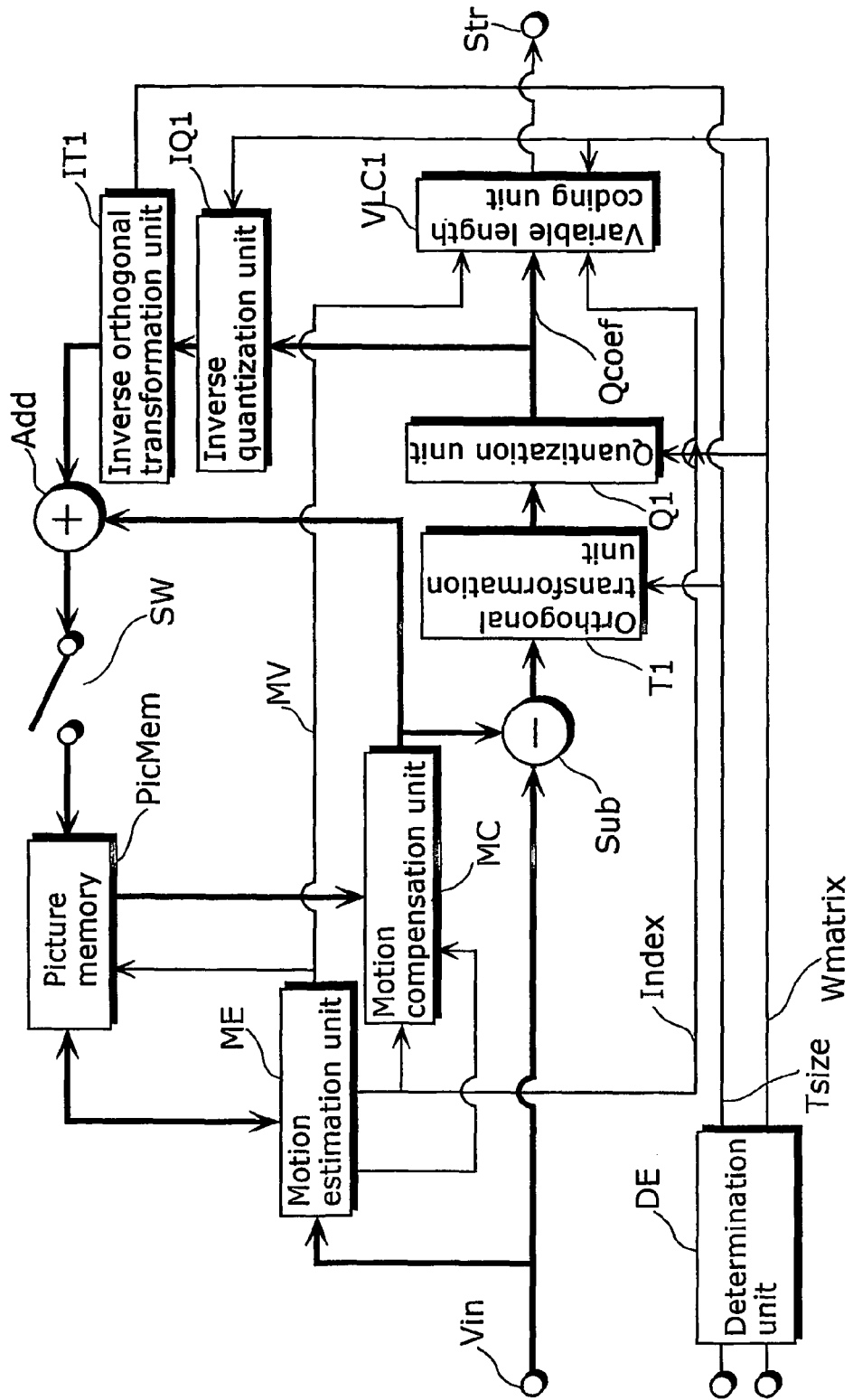
FIG. 4 is a block diagram showing a construction of a picture coding apparatus according to an embodiment of the present invention.

FIG. 4 is a block diagram showing the construction of a picture coding apparatus according to the embodiment of the present invention. In this drawing, a picture coding apparatus 1 is comprised of a determination unit DE, a motion estimation unit ME, a motion compensation unit MC, a subtraction unit Sub, an orthogonal transformation unit T1, a quantization unit Q1, an inverse quantization unit IQ1, an inverse orthogonal transformation unit IT1, an addition unit Add, a picture memory PicMem, a switch SW, and a variable length coding unit VLC1.

The determination unit DE determines (1) a block size Tsize of a block on which orthogonal transformation should be performed by the orthogonal transformation unit T1 (hereinafter referred to as "orthogonal transformation size") and (2) a weighting matrix Wmatrix for changing a quantization matrix to be used in the quantization unit Q1. There are two orthogonal transformation sizes Tsize, a first size and a second size, which are selectively determined on a per-macroblock basis. Here, the first size shall indicate 4×4 pixels and the second size shall indicate 8×8 pixels. As for weighting matrices Wmatrix, there are a weighting matrix W4 or the first size and a weighting matrix W8 for the second size.

An orthogonal transformation size is determined based on the resolution of the current image to be coded, whether there are many variations in brightness and colors (high frequency components) and the bit rate of a coded stream Str, and the like. For example, the determination unit DE selects an orthogonal transformation size in the following manner:

Example 1: the determination unit DE selects the second size when the resolution level of the current image to be coded is equal to or larger than a first threshold, whereas it selects the first size when the resolution level of the current image is smaller than the first threshold. The resolution level of a HDTV and the like may be used as the first threshold;

Example 2: the determination unit DE selects the second size when the bit rate after coding is equal to or larger than a second threshold, whereas it selects the first size when the bit rate is smaller than the second threshold. The second threshold may be 10 Mbps, for example; and Example 3: the determination unit DE judges, from a previous result of orthogonal transformation, the number of high frequency components, and selects the second size when the number of high frequency components is larger than a third threshold, whereas the determination unit DE selects the first size when such number is smaller than the third threshold. In other words, a judgment shall be made here on whether or not there are many high frequency components, by counting the number or values of frequency coefficients which are higher than the "n"th order. Here, a value which is predetermined according to picture quality and the like may be the third threshold.

In the above examples 1~3, the determination unit DE may further determine an orthogonal transformation size according to a block size for motion compensation.

Figure 5C:
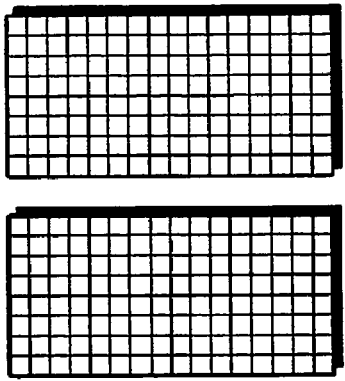
FIGS. 5A~5G are diagrams showing block sizes for motion compensation at the time of inter picture coding.
Figure 5B:
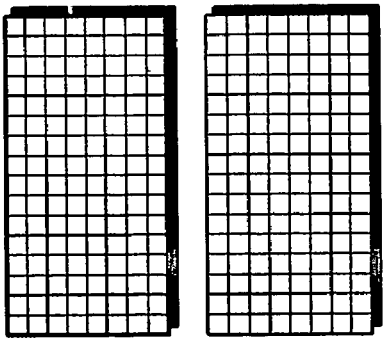
Figure 5A:
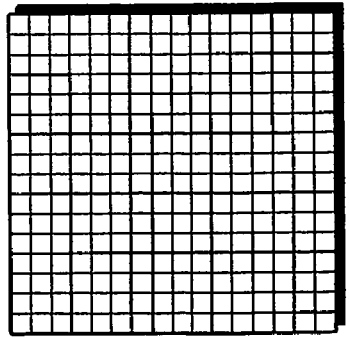
Figure 5G:
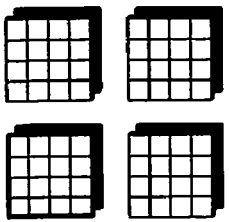
Figure 5F:
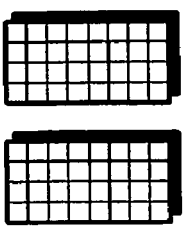
Figure 5E:
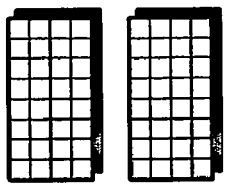
Figure 5D:
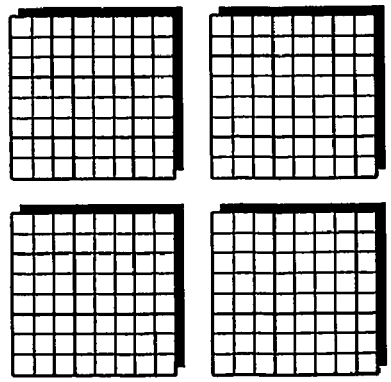

FIGS. 5A~5G are diagrams showing block sizes for motion compensation (hereinafter referred to as "motion compensation size(s)) at the time of inter picture coding. Of them, FIG. 5A shows the motion compensation size of 16×16 pixels, FIG. 5B shows 16×8 pixels, FIG. 5C shows 8×16 pixels, and FIG. 5D shows 8×8 pixels. Furthermore, the motion compensation size of 8×8 pixels shown in FIG. 5D may further be divided into one of the following sizes so as to be used as a motion compensation size: 8×4 pixels shown in FIG. 5E, 4×8 pixels shown in FIG. 5F, and 4×4 pixels shown in FIG. 5G. There is preferably a consistency between block sizes used as a motion compensation size and an orthogonal transformation size so that processing can be simplified and artifacts at a block boundary will not be dispersed. In consideration of this, the determination unit DE determines an orthogonal transformation size in a manner in which an orthogonal transformation size becomes smaller than a motion compensation size.

More specifically, in the case of inter picture coding, when motion compensation sizes are as shown in FIGS. 5A~5D (16×16 pixels, 16×8 pixels, 8×16 pixels, and 8×8 pixels), exactly one or more 8×8 pixel blocks shown in FIG. 5D is/are contained. In these cases, since higher efficiency is achieved by performing orthogonal transformation on an 8×8 pixel block basis, the determination unit DE shall select the second size (8×8 pixels) as an orthogonal transformation size. Meanwhile, when a motion compensation size is smaller than 8×8 pixels as shown in FIGS. 5E~5G, the determination unit DE shall select the first size (4×4 pixels).

The more frequently the determination unit DE switches orthogonal transformation sizes between the first size and the second size, the more complicated the construction of the picture coding apparatus and picture decoding apparatus becomes. A better coding efficiency, however, can be achieved by this.

Note that the determination unit DE may determine an orthogonal transformation size on a slice/picture/GOP/sequence basis, instead of on a macroblock basis. Moreover, in the case where an orthogonal transformation size is indicated from outside the picture coding apparatus, the determination unit DE may use such indicated size as an orthogonal transformation size Tsize.

The motion compensation unit MC reads out a reference block according to motion vector(s) estimated by the motion estimation unit ME so as to generate a predictive image from such reference block, and outputs the generated predictive image to the subtraction unit Sub. A predictive image is outputted for each block having a motion compensation size selected from among the motion compensation sizes shown in FIGS. 5A~5G.

The subtraction unit Sub calculates, as a prediction error, the difference between an image in the picture signal Vin and a predictive image for each block having a motion compensation size selected from among the motion compensation sizes shown in FIGS. 5A~5G, and outputs such calculated prediction error to the orthogonal transformation unit T1.

The orthogonal transformation unit T1 performs orthogonal transformation on a prediction error so as to transform it into frequency coefficients for each block having an orthogonal transformation size Tsize outputted by the determination unit DE, and outputs the resultant to the quantization unit Q. Here, referring to FIGS. 6A and 6B, a description is given of orthogonal transformation to be performed in the case where an orthogonal transformation size Tsize is the second size (8×8 pixels). Illustrated in the left side of FIG. 6A is a 16×16 pixel luma macroblock. Since the second size is indicated as an orthogonal transformation size Tsize in the case of intra picture coding, the orthogonal transformation unit T1 performs orthogonal transformation on an 8×8 pixel block basis. Furthermore, as shown in the right side of the FIG. 6A, the orthogonal transformation unit T1 integrates four DC components of four orthogonally-transformed 8×8 pixel blocks so as to generate one 2×2 pixel luma DC block, and then performs 2×2 pixel block orthogonal transformation on such luma DC block. Note that the generation of a luma DC block and the execution of 2×2 pixel block orthogonal transformation may be omitted. Meanwhile, since the second size is indicated as an orthogonal transformation size Tsize in the case of inter picture coding, the orthogonal transformation unit T1 performs orthogonal transformation on an 8×8 pixel block basis. In this case, the generation of a luma DC block and the execution of orthogonal transformation shall not be carried out.

Illustrated in the left side of FIG. 6B is an 8×8 pixel chroma macroblock. Regarding a picture signal, in general, a chrominance signal has half the number of pixels both horizontal and vertical directions compared with a luminance signal. Thus, the number of pixels in a chroma macroblock is 8×8 pixels. In the case of intra picture coding, the orthogonal transformation unit T1 performs orthogonal transformation on a 4×4 pixel block basis, which is half the size of the second size indicated as an orthogonal transformation size Tsize. Then, the orthogonal transformation unit T1 integrates four DC components of four orthogonally-transformed 4×4 chroma block so as to generate one 2×2 pixel chroma DC block, and then performs 2×2 pixel block orthogonal transformation on such chroma DC block. Note that the generation of a chroma DC block and the execution of 2×2 pixel block orthogonal transformation may be omitted. Meanwhile, in the case of inter picture coding, the orthogonal transformation unit T1 performs orthogonal transformation on a 4×4 pixel block basis, which is half the size of the second size indicated as an orthogonal transformation size Tsize. In this case, the generation of a chroma DC block and the execution of orthogonal transformation shall not be carried out.

As described above, when an orthogonal transformation size Tsize indicates the second size, the orthogonal transformation unit T1 performs two-step orthogonal transformation on a luma block and a chroma block in the case of intra picture coding, whereas it performs a single-step orthogonal transformation in the case of inter picture coding. Meanwhile, when an orthogonal transformation size Tsize indicates the first size, the orthogonal transformation unit T1 performs orthogonal transformation as in the case of the second size since the difference between the first and second sizes is the difference in a block size, but a single-step coding shall be performed both in the case of intra picture coding and inter picture coding.

The quantization unit Q1 quantizes a 4×4- or 8×8-pixel frequency coefficient block inputted from the orthogonal transformation unit T1, and outputs quantized values Qcoef to the variable length coding unit VLC. In so doing, the quantization unit Q1 weights a quantization matrix according to a weighting matrix Wmatrix determined by the determination unit DE, and quantizes the frequency coefficient block using such weighted quantization matrix. FIGS. 7A and 7B are diagrams illustrating weighting matrices. When an orthogonal transformation size is the first size, a weighting matrix Wmatrix to be inputted from the determination unit DE shall be a 4×4 pixel weighting matrix W4mat shown in FIG. 7B, whereas when an orthogonal transformation size is the second size, a weighting matrix Wmatrix shall be an 8×8 pixel weighting matrix W8mat shown in FIG. 7A. By using a weighting matrix, the sizes of quantization steps are changed on a per-frequency component basis at the time of quantizing orthogonally-transformed frequency components. It is known in MPEG-2 that the use of a weighting matrix improves coding efficiency. Since plural orthogonal transformation sizes are switched between them in the present embodiment, it becomes possible to further improve coding efficiency by employing a different weighting matrix for each of the orthogonal transformation sizes. In FIG. 7A, W8i,j ("i" and "j" are any of 0~7 respectively) indicates weighting to be applied to the component at the "i"th row in the eight rows and the "j"th column in the eight columns. In FIG. 7B, W4i,j ("i" and "j" are any of 0~3 respectively) indicates weighting to be applied to the component at the "i"th row in the four rows and the "j"th column in the four columns.

The inverse quantization unit IQ1 performs inverse quantization on the quantized values Qcoef so as to turn them into frequency coefficients, and outputs such frequency coefficients to the inverse orthogonal transformation unit IT1. Stated another way, the inverse quantization unit IQ1 performs processing that is the inverse of the processing performed by the quantization unit Q1, according to the weighting matrix Wmatrix inputted from the determination unit DE.

The inverse orthogonal transformation unit IT1 performs inverse frequency transformation on the frequency coefficient block received from the inverse quantization unit IQ1 so as to transform it into a prediction error, and outputs such prediction error to the addition unit Add. Stated another way, the inverse orthogonal transformation unit IT1 performs processing that is the inverse of the processing performed by the orthogonal transformation unit T1 for each block having an orthogonal transformation size Tsize inputted from the determination unit DE.

The addition unit Add adds the prediction error and a predictive image outputted from the motion compensation unit MC for each block having the same motion compensation size as the one on which the subtraction unit Sub has performed processing, and generates a decoded image.

The switch SW turns to ON when it is indicated that such decoded image should be stored, and the decoded image is to be stored into the picture memory PicMem.

Meanwhile, the motion estimation unit ME, which receives the picture signal Vin on a macroblock basis, estimates an image area closest to such input image signal Vin from among the decoded pictures stored in the picture memory PicMem, and determines motion vector(s) MV indicating the position of such area. Motion vectors are estimated for each block, which is obtained by further dividing a macro block. When this is done, it is possible to use more than one picture as reference pictures. A reference picture used for estimating a motion vector shall be indicated by an identification number (reference index Index). The picture numbers of the respective pictures stored in the picture memory PicMem are associated with reference indices.

The motion compensation unit MC reads out an optimum picture as a predictive picture from among the decoded pictures stored in the picture memory PicMem, based on the motion vectors detected in the above processing and the reference indices Index.

The variable length coding unit VLC1 performs variable length coding on each of the quantized values Qcoef, reference indices Index, and motion vectors MV so as to output them as a coded stream Str. In so doing, the variable length coding unit VLC1 generates size information TsizeFlag according to each orthogonal transformation size Tsize, and codes such size information TsizeFlag and a weighting matrix Wmatrix. There are two types of weighting matrices Wmatrix: a weighting matrix W8mat for 8×8 orthogonal transformation and a weighting matrix W4mat for 4×4 orthogonal transformation.

Figure 8:
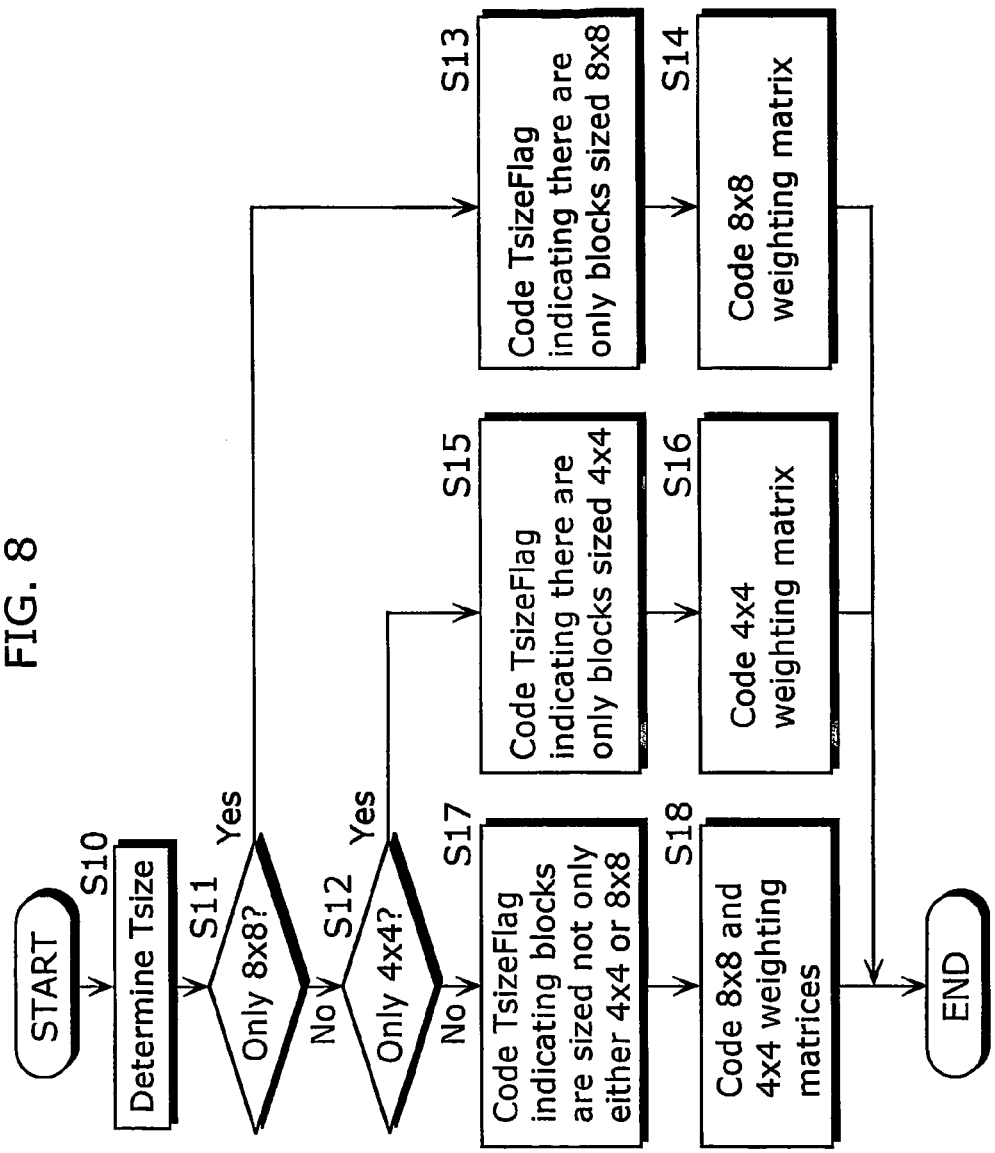
FIG. 8 is a flowchart showing coding processing performed in the picture coding apparatus according to the present embodiment.

FIG. 8 is a flowchart showing coding processing performed in the picture coding apparatus according to the present embodiment. The determination unit DE determines an orthogonal transformation size Tsize and a weighting matrix Wmatrix on a per-macroblock basis (S10). Orthogonal transformation and quantization shall be performed based on such determined orthogonal transformation size Tsize and weighting matrix Wmatrix. Furthermore, the variable length coding unit VLC1 performs coding in a manner that allows size information TsizeFlag indicating Tsize to be incorporated into the coded stream Str for every predetermined section, i.e. one of the following sections: sequence, GOP, picture, slice, and macroblock. Here, the size information TsizeFlag means any one of the following: (A) all orthogonal transformation sizes within a predetermined section are 8×8 pixels; (B) all orthogonal transformation sizes within a predetermined section are 4×4 pixels; and (C) it is unknown whether all orthogonal transformation sizes within a predetermined section are either 8×8 pixels or 4×4 pixels (i.e. there is a mixture of 4×4 pixel blocks and 8×8 pixel blocks). Note that it is not necessary to distinguish all the size information TsizeFlag (A)~(C) from one another, and therefore that a distinction may be made, for example, only between (A) and (C), and (B) and (C). Furthermore, when there should not be a mixture of 8×8 and 4×4 orthogonal transformation sizes, a distinction may be made only between (A) and (B).

Figure 9A:
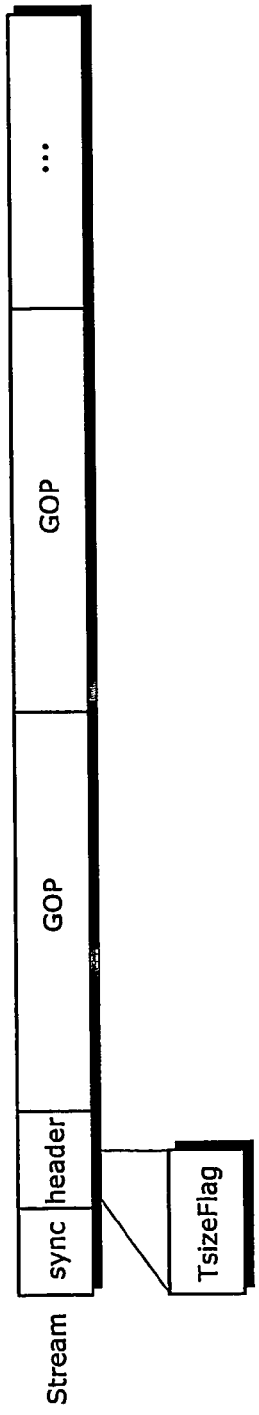
FIGS. 9A~9C are diagrams showing where size information is inserted into each coded stream.

As shown in FIG. 9A, when coding size information TsizeFlag on a per-GOP basis as a predetermined section, the variable length coding unit VCL1 judges whether all orthogonal transformation sizes Tsize within such section are either the second size (8×8 pixels) or the first size (4×4 pixels) (S11 and S12).

Figure 10A:
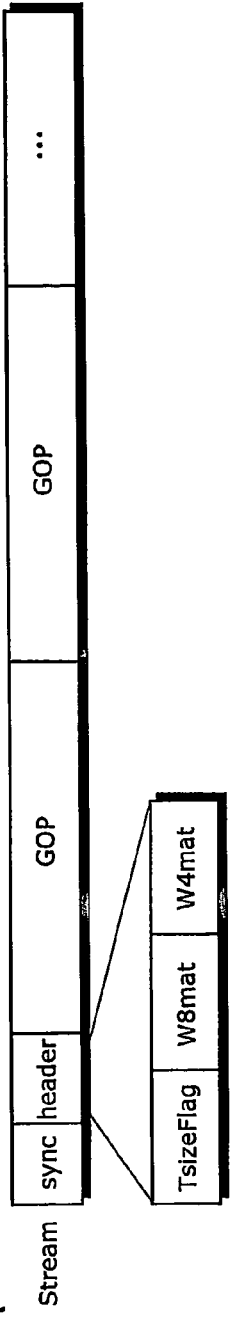
FIGS. 10A~10C are diagrams showing where size information and a weighting matrix are inserted into each coded stream on a per-GOP basis.
Figure 10B:
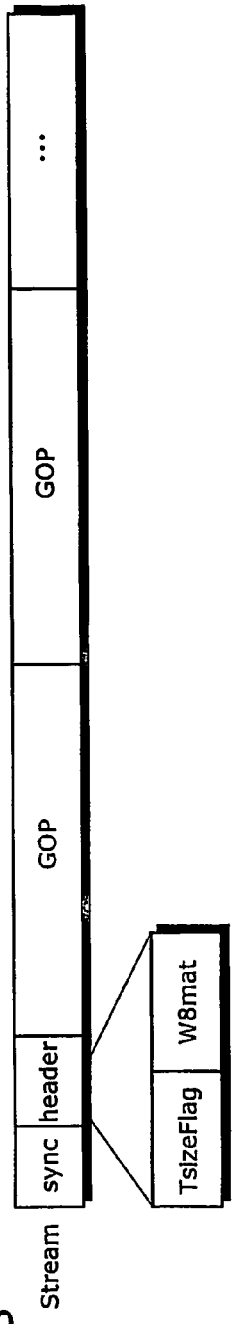

When the result of the judgment indicates that there are only 8×8 pixel blocks, the variable length coding unit VLC1 codes size information TsizeFlag indicating that all the orthogonal transformation blocks in the GOP are sized 8×8 pixels (S13), and codes a weighting matrix W8mat for an 8×8 pixel block (S14). FIG. 10B shows a coded stream Str to be generated in this case.

Figure 10C:
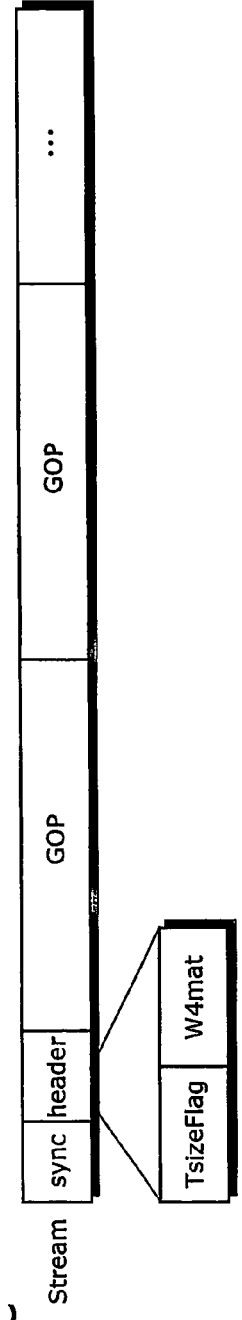

When the result of the judgment indicates that there are only 4×4 pixel blocks, the variable length coding unit VLC1 codes size information TsizeFlag indicating that all the orthogonal transformation blocks in the GOP are sized 4×4 pixels (S15), and codes a weighting matrix W4mat for a 4×4 pixel block (S16). FIG. 10C shows a coded stream Str to be generated in this case.

When the result of the judgment indicates that all the orthogonal transformation blocks cannot be sorted into either 8×8 pixel block or 4×4 pixel block (i.e. there is a mixture of them), the variable length coding unit VLC1 codes size information TsizeFlag indicating that all the orthogonal transformation blocks in the GOP are not sized only either 4×4 pixels or 8×8 pixels (S17), and codes a weighting matrix W4mat for a 4×4 pixel block and a weighting matrix W8mat for an 8×8 pixel block (S18). FIG. 10A shows a coded stream Str to be generated in this case. Note that in order to inform the decoding apparatus whether an orthogonal transformation size Tsize of each macroblock is the first size or the second size, it is desirable for the variable length coding unit VLC1 to perform coding in a manner in which an orthogonal transformation size Tsize will be incorporated on a macroblock basis.

Figure 9B:
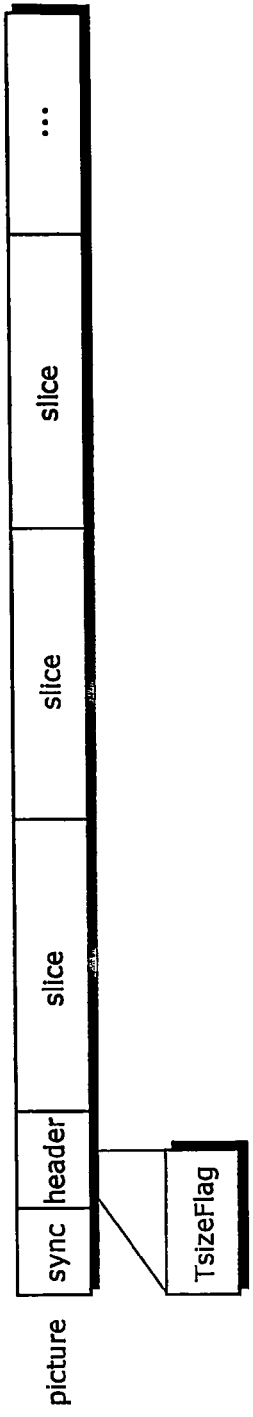

In the above description, an example is given for the case where the variable length coding unit VLC1 codes size information TsizeFlag on a per-GOP basis, but the variable length coding unit VLC1 may code size information TsizeFlag on a per-slice basis, as shown in FIG. 9B. In such case, weighting matrices shall be coded as shown in FIGS. 11A~11C.

Figure 11A:
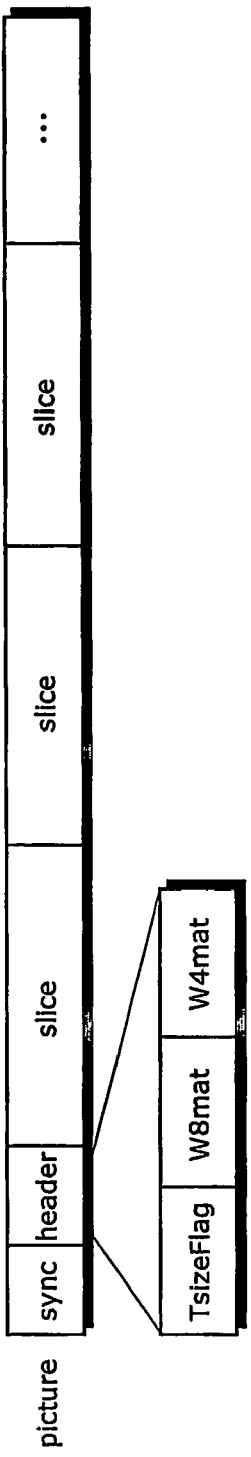
FIGS. 11A~11C are diagrams showing where size information and a weighting matrix are inserted into each coded stream on a per-slice basis.
Figure 11B:
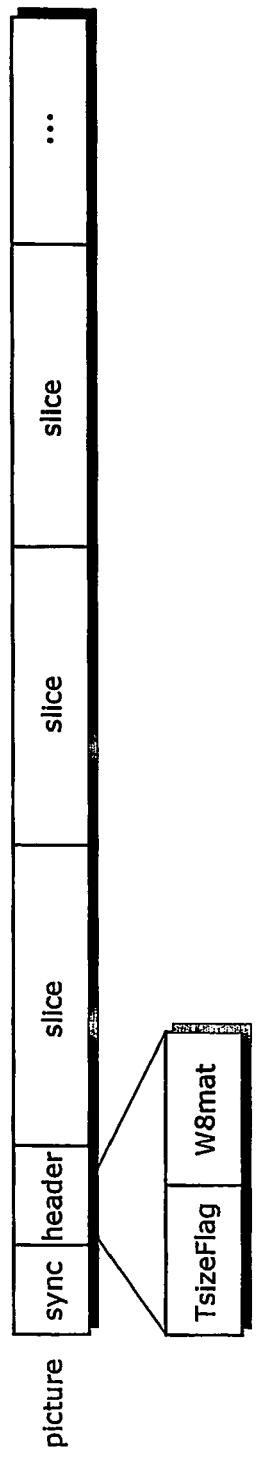
Figure 11C:
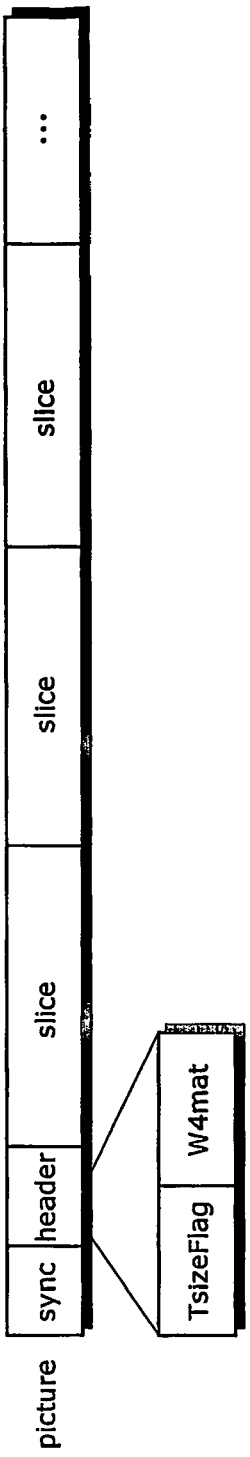

FIG. 11A shows the structure of a coded stream in the case where there is a mixture of the first size and the second size within a predetermined section. In the header of such coded stream, (prior to the current picture to be coded) size information TsizeFlag indicating a mixture of the above two orthogonal transformation sizes is coded, and an 8×8 orthogonal transformation weighting matrix W8mat and a 4×4 orthogonal transformation weighting matrix W4mat are coded subsequently to the size information TsizeFlag. Note that the 8×8 orthogonal transformation weighting matrix W8mat and the 4×4 orthogonal transformation weighting matrix W4mat do not necessarily have to be in this order, and therefore that these two types of matrices may be determined to be arranged in the inverse order. FIG. 11B shows the structure of a coded stream in the case where only the second size is used for orthogonal transform within a predetermined section. In the header of such coded stream, (prior to the current picture to be coded) size information TsizeFlag indicating the 8×8 orthogonal transformation size is coded, and an 8×8 orthogonal transformation weighting matrix W8mat is coded subsequently to the size information TsizeFlag. FIG. 11C shows the structure of a coded stream in the case where only the first size is used for orthogonal transform within a predetermined section. In the header of such coded stream, (prior to the current picture to be coded) size information TsizeFlag indicating the 4×4 orthogonal transformation size is coded, and a 4×4 orthogonal transformation weighting matrix W4mat is coded subsequently to the size information TsizeFlag.

Figure 9C:
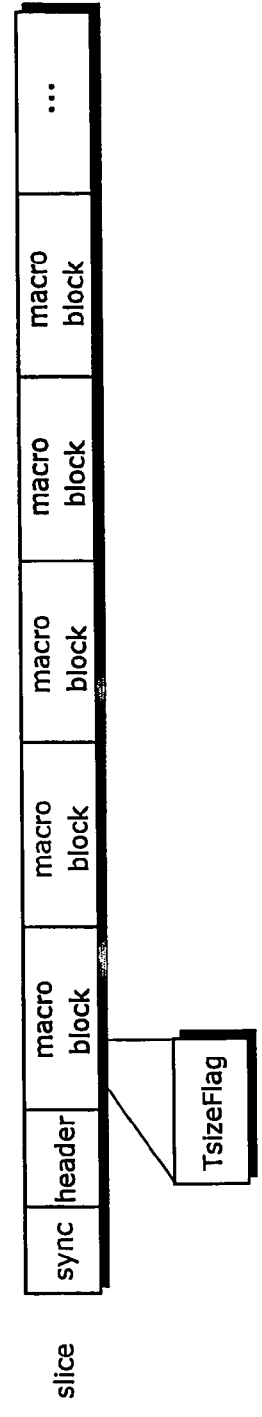

Furthermore, as shown in FIG. 9C, the variable length coding unit VLC1 may code size information TsizeFlag on a macroblock basis. In the case of FIG. 9C, however, an orthogonal transformation size Tsize itself may be coded, instead of size information TsizeFlag. The above-described FIGS. 9A~9C respectively indicate where size information TsizeFlag is to be inserted. In the case where an orthogonal transformation size is switched to another one for every stream or sequence made up of plural pictures, it is desirable to insert size information TsizeFlag into the top of each stream or sequence, as shown in FIG. 9A. This is effective in the case where there are few changes in the size and quality of pictures throughout a stream or a sequence. Meanwhile, in the case where the image contents change on a picture-by-picture basis and therefore an orthogonal transformation size needs to be switched to another one for each picture, it is desirable to place size information TsizeFlag at the top of each picture, as shown in FIG. 9B. Furthermore, in the case where an orthogonal transformation size needs to be switched to another one on a macroblock basis, it is desirable to place size information TsizeFlag at the top of each macroblock, as shown in FIG. 9C.

<Variation>

Figure 12:
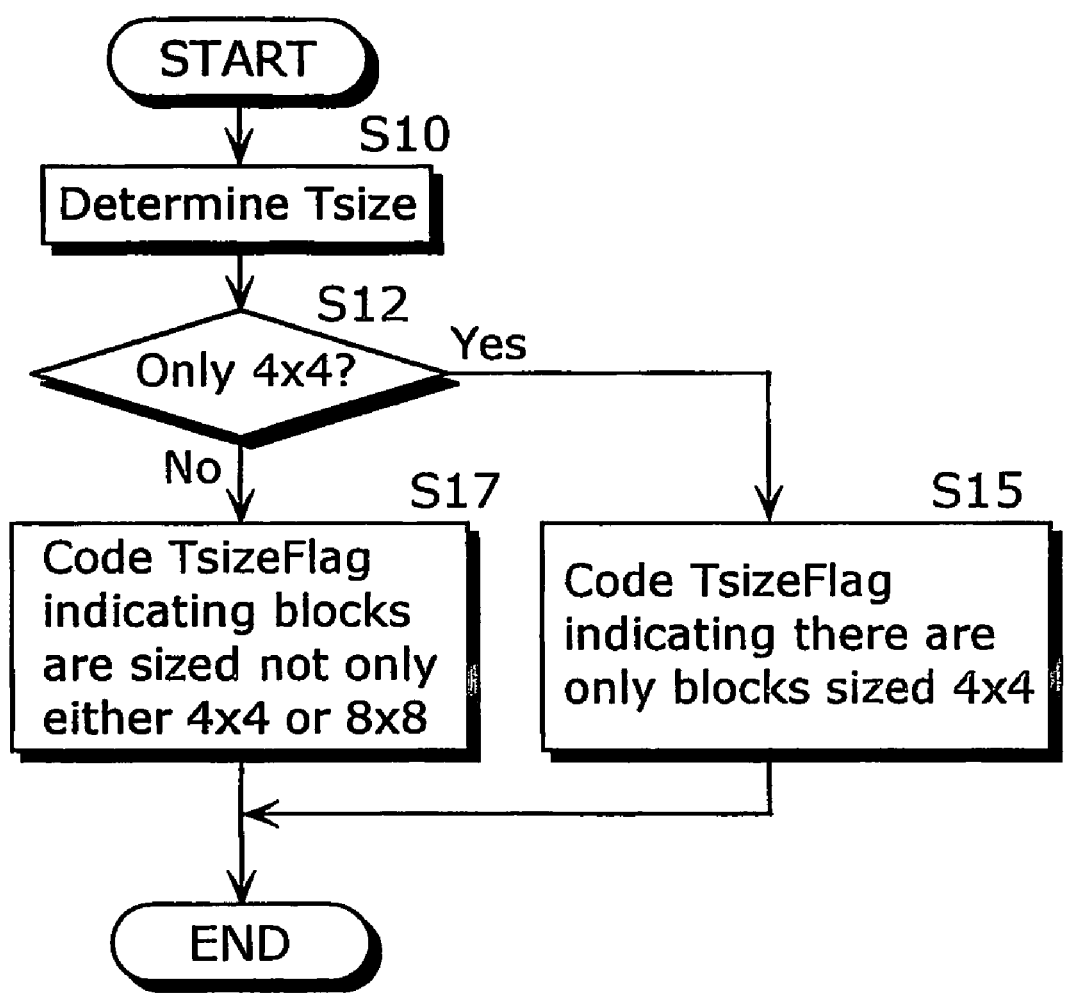
FIG. 12 is a flowchart showing an example variation of the picture coding processing.

(1) FIG. 12 is a flowchart showing an example variation of the picture coding processing shown in FIG. 8. This drawing shows coding processing to be performed in the case where a distinction is made between the above-described size information TsizeFlag (B) and (C). The same steps as those shown in FIG. 8 are assigned the same numbers. With this construction, size information TsizeFlag indicates whether or not all orthogonal transformation sizes in a predetermined section described above are 4×4 pixels, and such indication shall be represented by 1 bit.

(2) It is desirable that an optimum value is set to each weighting matrix W8mat and weighting matrix W4mat. However, when the determination unit DE determines a weighting matrix Wmatrix on a per-stream or -picture basis, it may be possible that a weighting matrix W8mat is derived from a weighting matrix W4mat, and vice versa.

Figure 13:
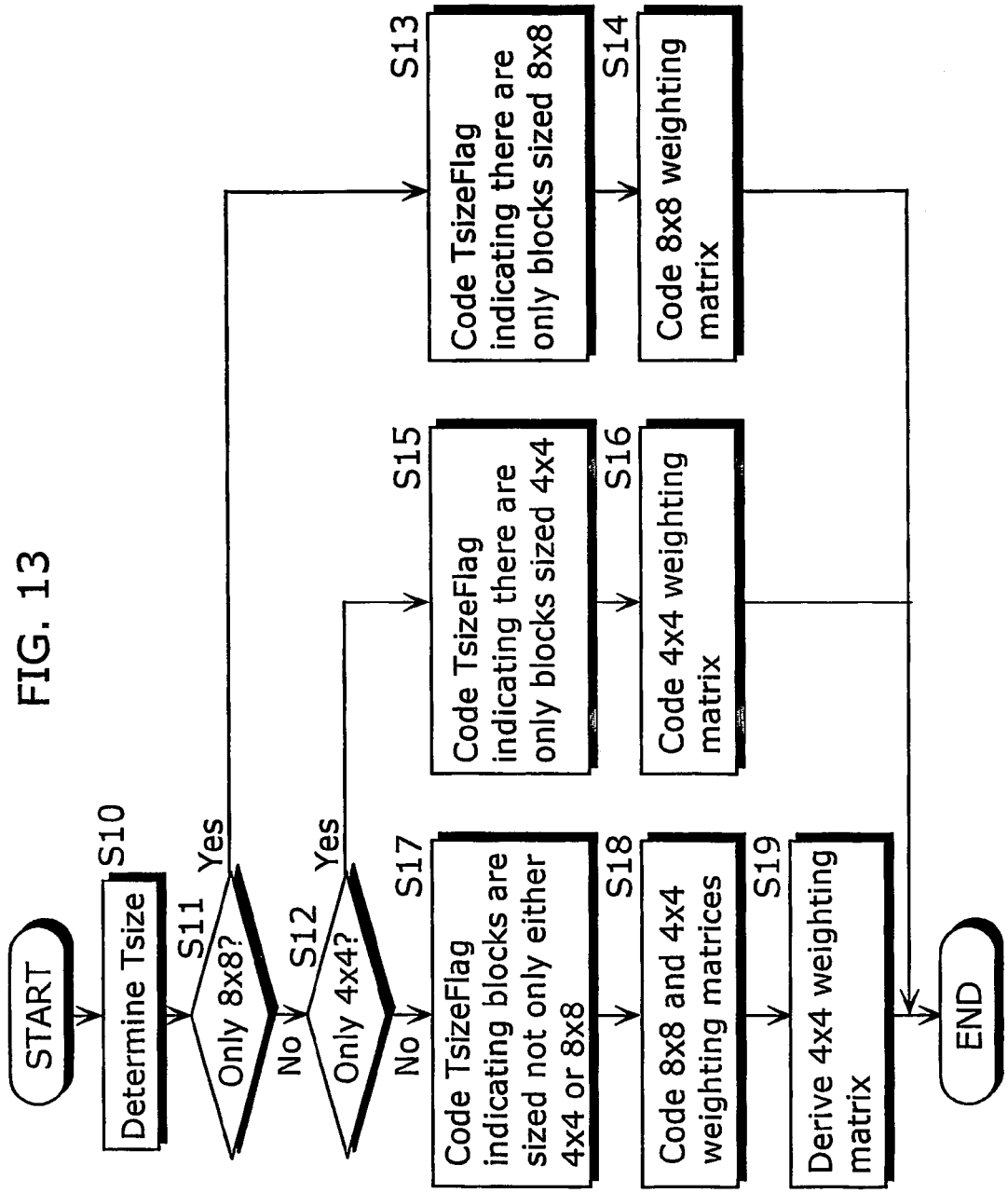
FIG. 13 is a flowchart showing picture coding processing to be performed in the case where a 4×4 weighting matrix is derived from an 8×8 weighting matrix.

FIG. 13 is a flowchart showing picture coding processing to be performed in the case where a weighting matrix W4mat is derived from a weighting matrix W8mat. The flowchart is newly added with Step 19, compared with the flowchart shown in FIG. 8. The same steps as those in FIG. 8 are assigned the same numbers, and descriptions thereof are omitted. Here, only different points between FIGS. 8 and 9 are described. In Step S19, the variable length coding unit VLC1 derives a 4×4 weighting matrix W4mat from an 8×8 weighting matrix W8mat in the following manner, and codes the derived weighting matrix W4mat:

W4 i, j=K*W8 2i, 2j ("i" and "j" are any of 0~3 respectively, and "K" is a constant number)

Note that the orthogonal transformation unit T1 derives a weighting matrix W4mat in the similar manner, so as to use it for orthogonal transformation.

Also note that the variable length coding unit VLC1 may not code the derived 4×4 weighting matrix W4mat.

Moreover, the quantization unit Q1 and the inverse quantization unit IQ1 may use different weighting matrices for intra picture coding and inter picture coding, even when processing has been performed on the same orthogonal transformation size in these types of coding. Furthermore, the quantization unit Q1 and the inverse quantization unit IQ1 may use different weighting matrices for a luminance signal and a chrominance signal.

Also, the quantization unit Q1 and the inverse quantization unit IQ1 may select a weighting matrix used for quantization from among plural weighting matrices.

Furthermore, the quantization unit Q1 and the inverse quantization unit IQ1 may weight a quantization matrix using a weighting matrix only for a larger orthogonal transformation size (e.g. the second size) for which the use of a weighting matrix is especially effective, and may not weight a quantization matrix for the other size (the first size) using a weighting matrix.

<Picture Decoding Apparatus>

Figure 14:
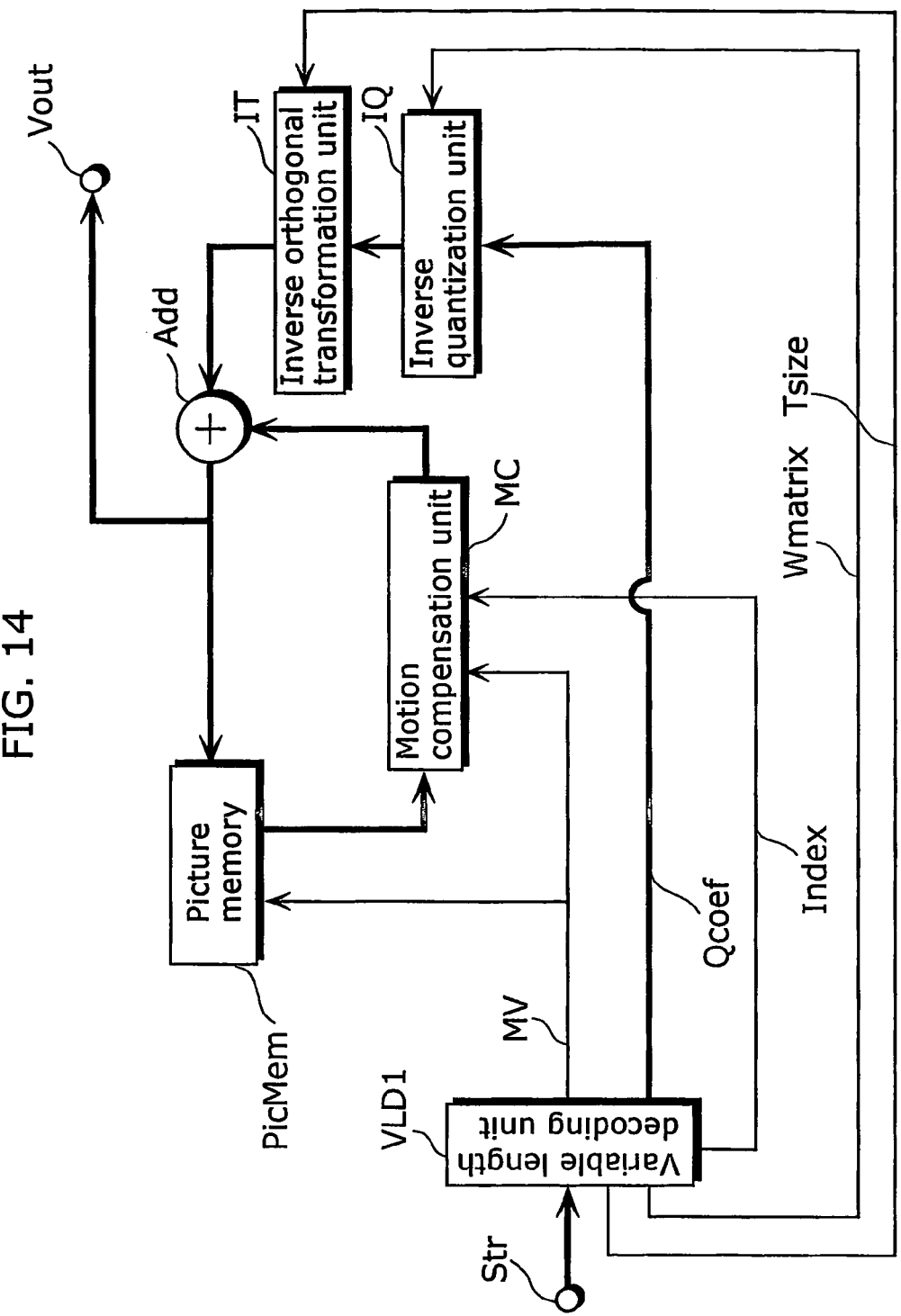
FIG. 14 is a block diagram showing a construction of a picture decoding apparatus according to the embodiment of the present invention.

FIG. 14 is a block diagram showing the construction of a picture decoding apparatus according to the embodiment of the present invention.

In this drawing, the same numbers are assigned to the same components as those shown in the picture coding apparatus shown in FIG. 4, and therefore descriptions thereof are omitted.

Figure 1:
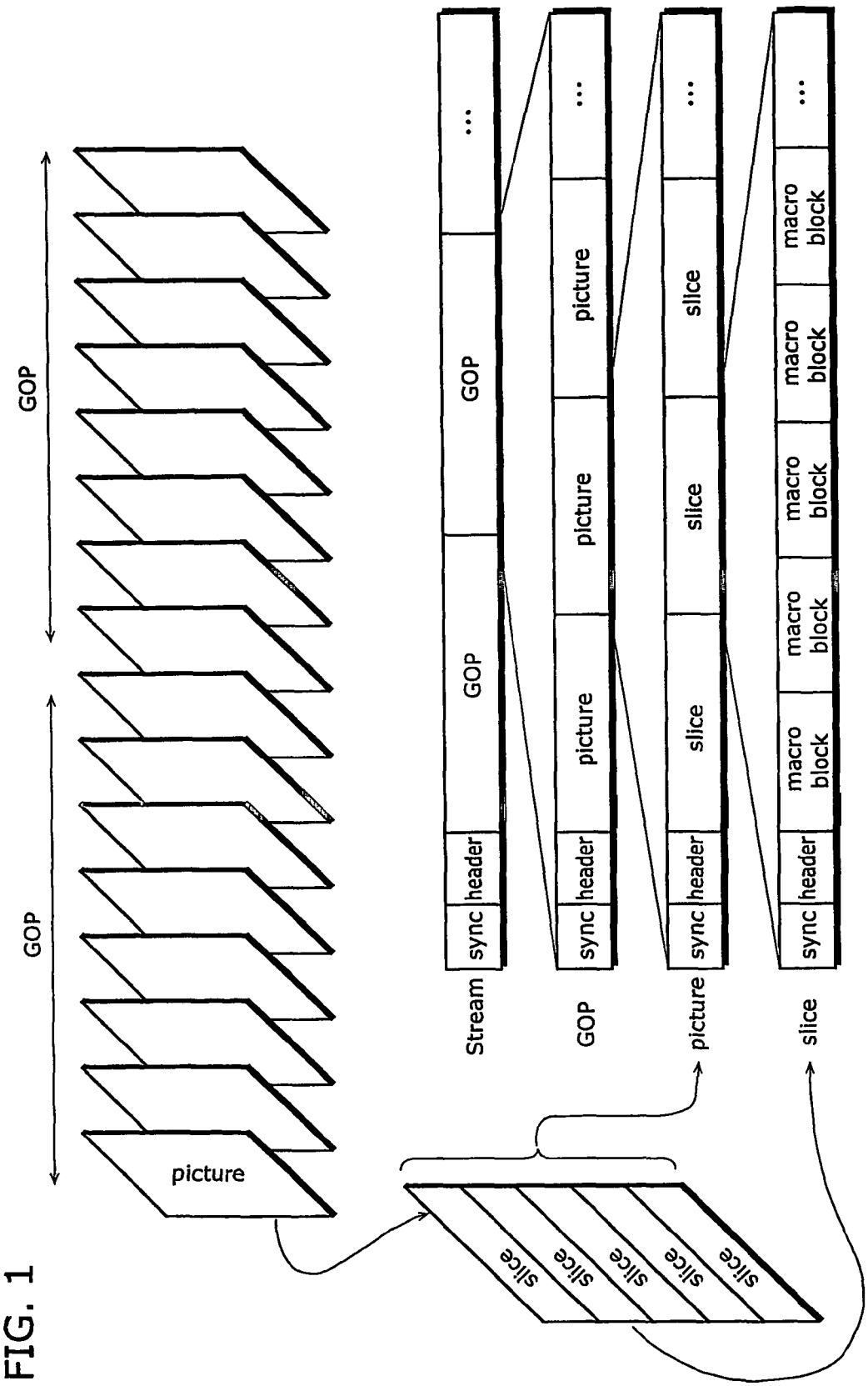
FIG. 1 is a diagram illustrating an example data structure of a bitstream.
Figure 2:
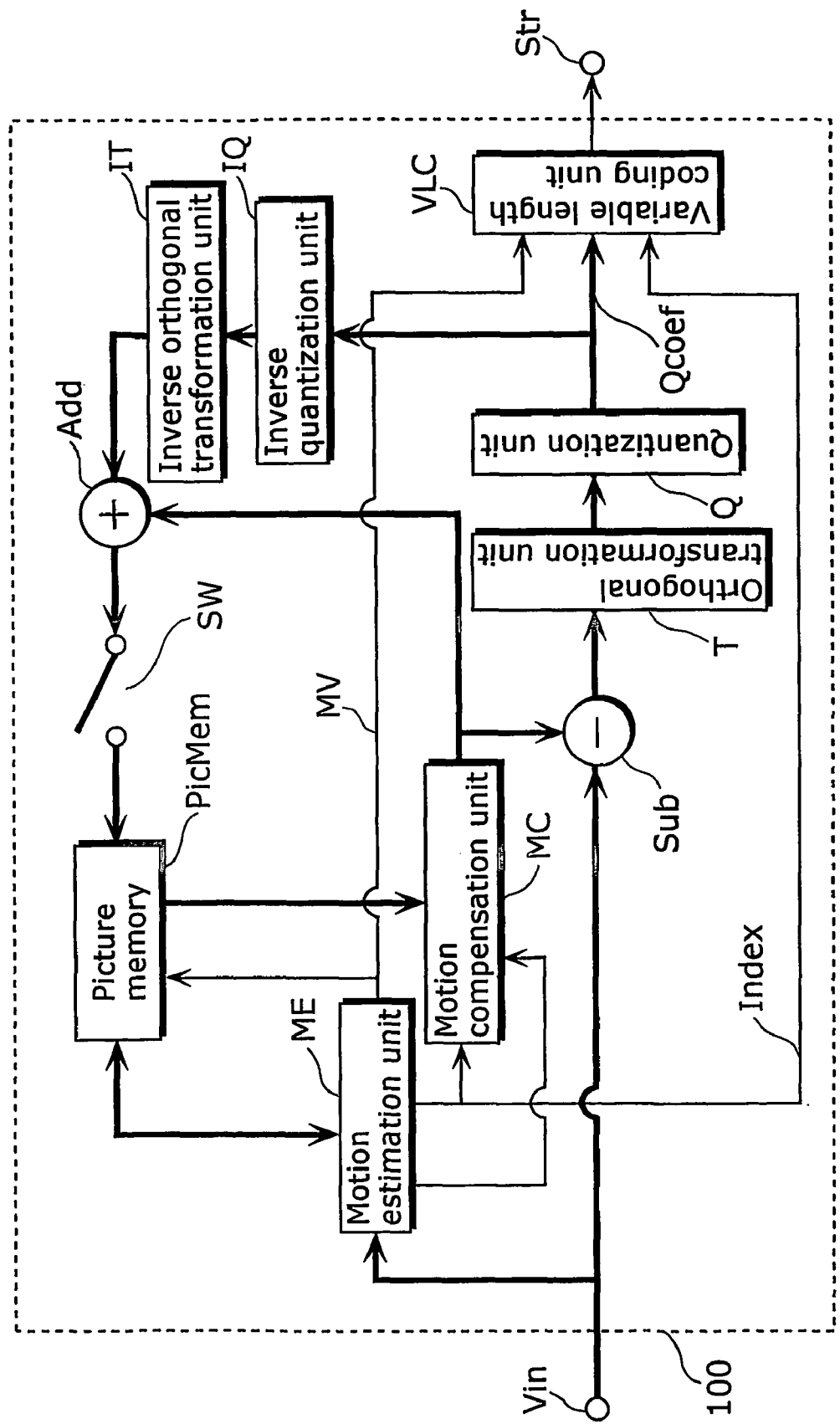
FIG. 2 is a block diagram showing a construction of an existing picture coding apparatus.
Figure 3:
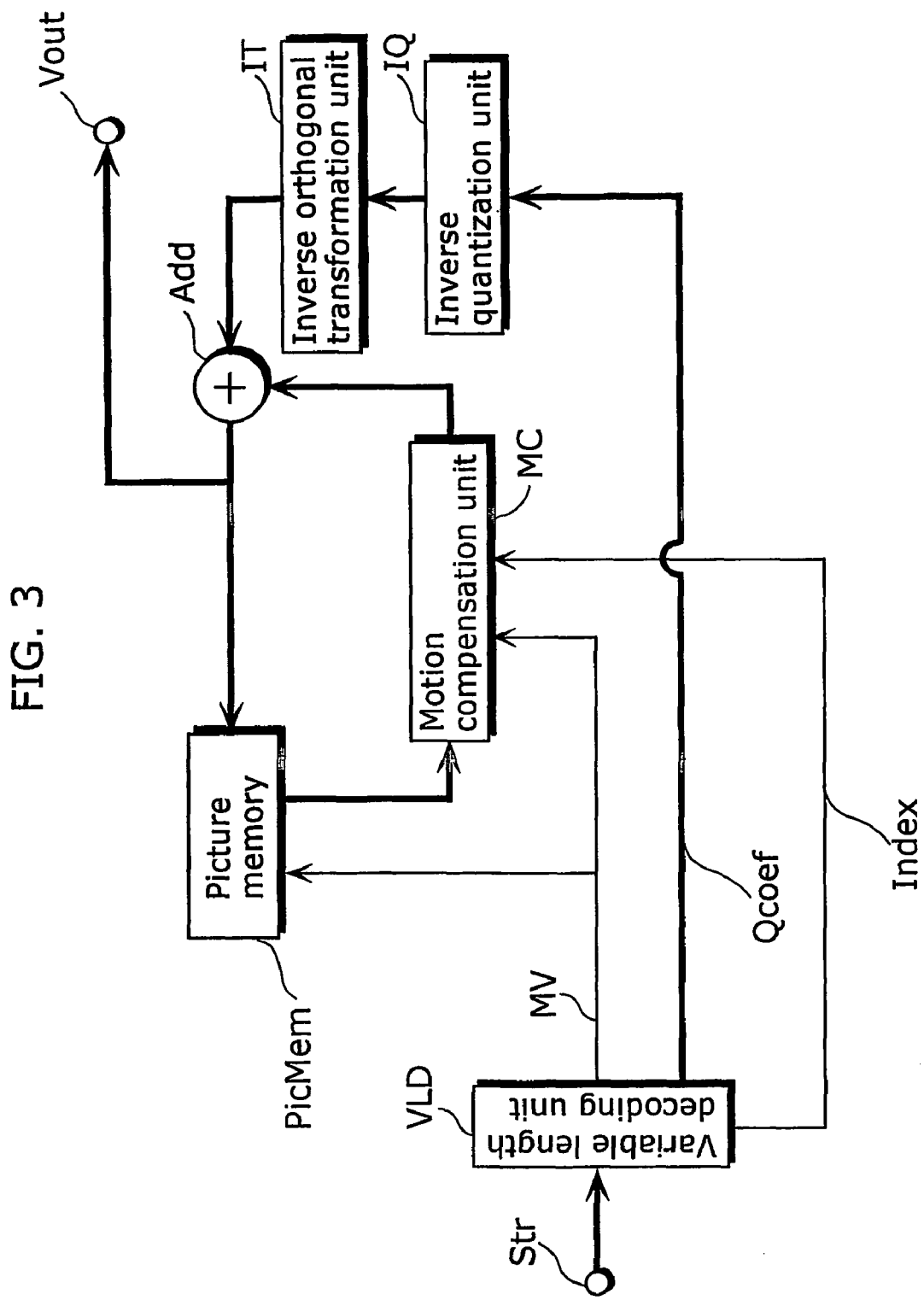
FIG. 3 is a block diagram showing a construction of an existing picture decoding apparatus.

The coded stream Str is decoded by the variable length decoding unit VLD1. The resultant of such decoding includes weighting matrices Wmatrix and orthogonal transformation sizes Tsize. The inverse quantization unit IQ1 weights a quantization matrix using a weighting matrix Wmatrix, and performs inverse quantization using the weighted quantization matrix. The inverse orthogonal transformation unit IT1 performs inverse orthogonal transformation in accordance with a determined orthogonal transformation size Tsize. The other operations are the same as those described in the block diagram of FIG. 3 that shows the picture decoding apparatus realizing an existing picture decoding method.

Figure 15:
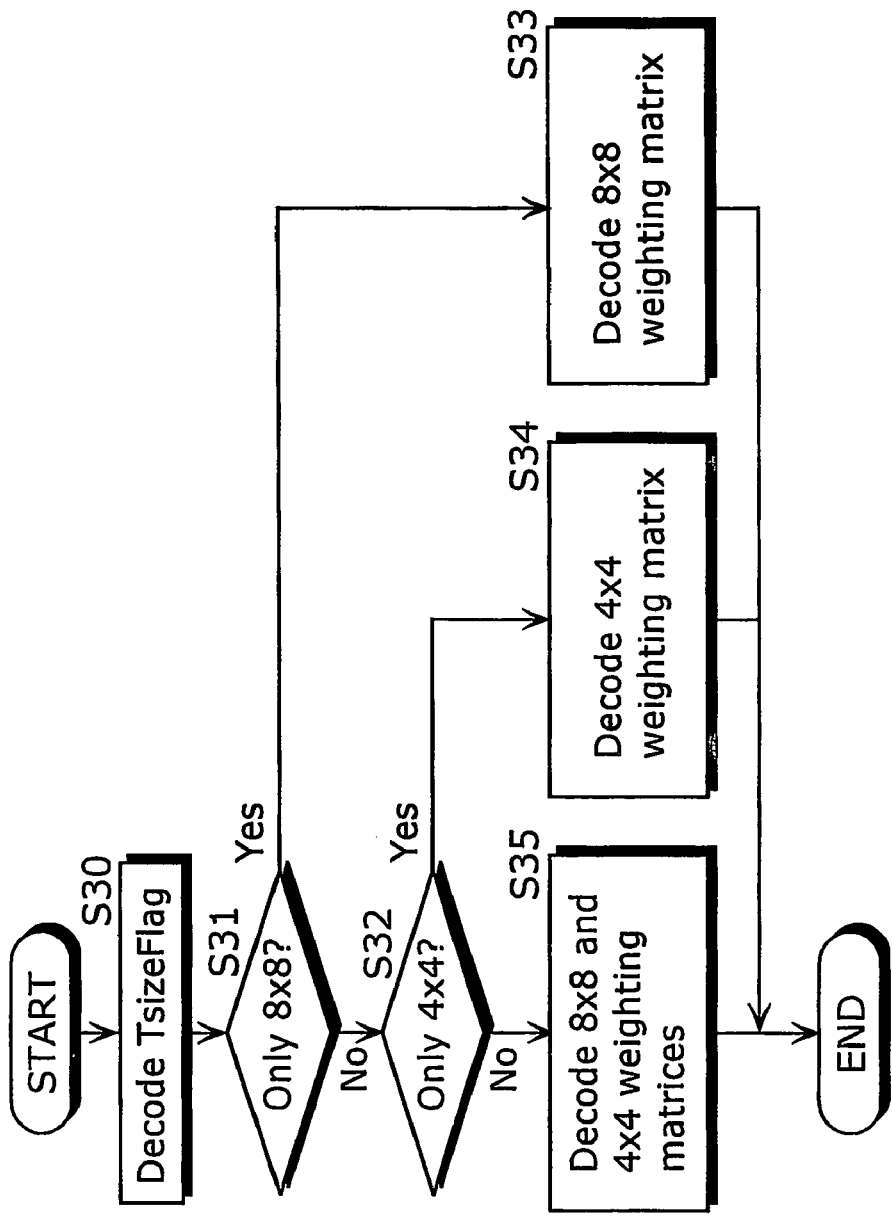
FIG. 15 is a flowchart showing variable length decoding processing performed by the picture decoding apparatus of the present embodiment.

FIG. 15 is a flowchart showing variable length decoding processing performed by the picture decoding apparatus of the present embodiment. As shown in this drawing, the variable length decoding unit VLD1 decodes size information TsizeFlag incorporated in the coded stream Str (S30), and judges whether such size information TsizeFlag indicates that there are only blocks having the second size (8×8 pixels) (S31). When judging that there are only blocks having the second size, the variable length decoding unit VLD1 decodes a weighting matrix W8mat (S33). Meanwhile, when the size information TsizeFlag does not indicate that only 8×8 orthogonal transformation has been applied and when such size information TsizeFlag indicates that there are only blocks having the first size (4×4 pixels) (S32), the variable length decoding unit VLD1 decodes a 4×4 weighting matrix W4mat (S34). Furthermore, when the size information TsizeFlag does not indicate that only 4×4 orthogonal transformation has been applied, the variable length decoding unit VLD1 decodes an 8×8 weighting matrix W8mat and a 4×4 weighting matrix W4mat (S35). Inverse quantization and inverse orthogonal transformation are then performed according to the result of this decoding.

Figure 16:
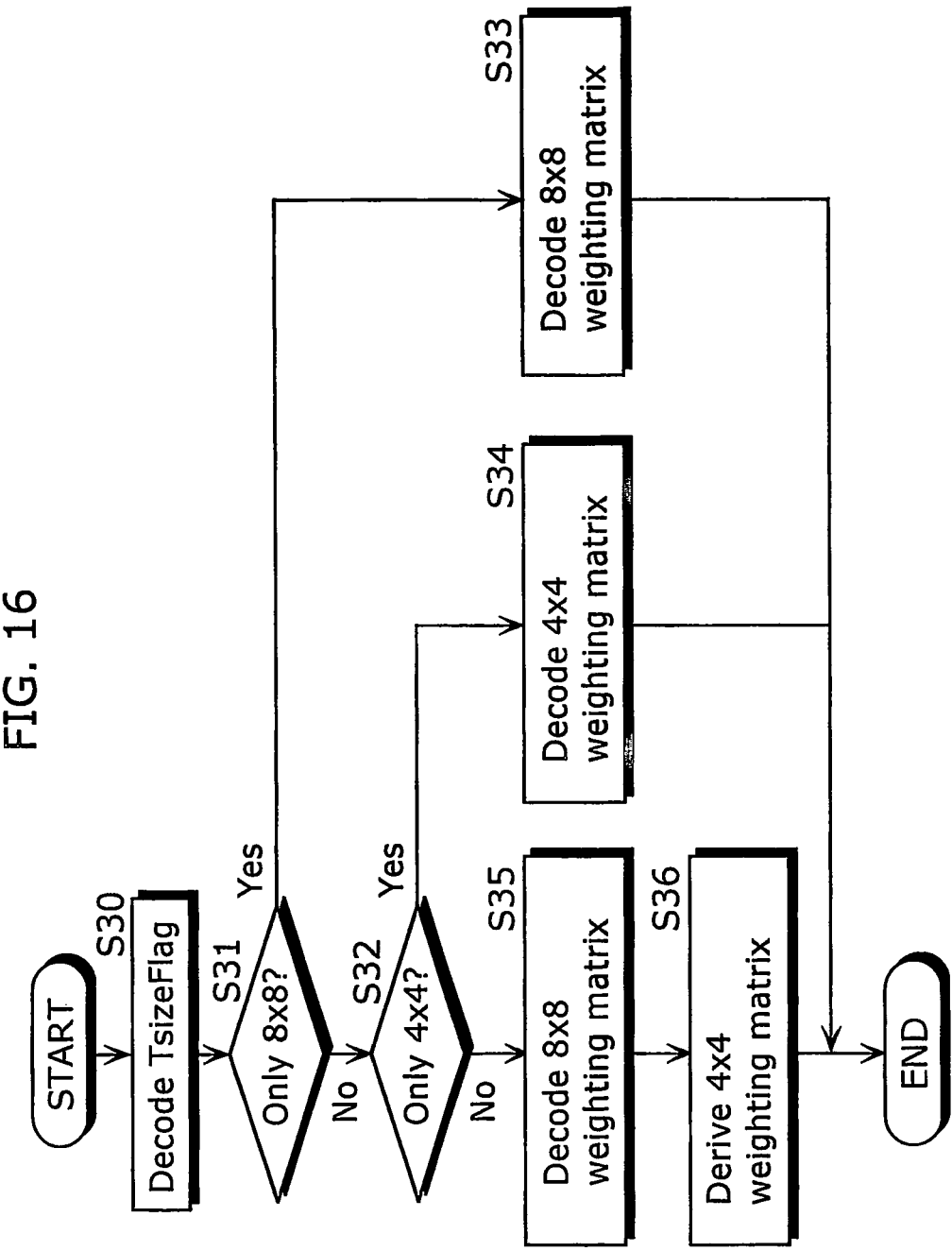
FIG. 16 is a flowchart showing picture decoding processing to be performed in the case where a weighting matrix W4mat is derived from a weighting matrix W8mat.

Note that when there is no weighting matrix W4mat coded in the coded stream Str, the picture decoding apparatus may derive a weighting matrix W4mat from a weighting matrix W8mat. FIG. 16 is a flowchart showing picture decoding processing to be performed in the case where a weighting matrix W4mat is derived from a weighting matrix W8mat. This flowchart is newly added with Step S36, compared with FIG. 15. In Step S36, a weighting matrix W4mat is derived from a weighting matrix W8mat, in the manner equivalent to that of Step S19 shown in FIG. 13.

As described above, the picture decoding apparatus according to the present embodiment is capable of correctly decoding the coded stream Str which has been coded by the picture coding apparatus shown in FIG. 4. Note that an orthogonal transformation size Tsize is described above as being obtained from the variable length decoding unit VLD1. However, in the case where an orthogonal transformation size Tsize is switched to another one depending on the size of a motion compensation block as described above, an orthogonal transformation size Tsize may be derived based on the size of a motion compensation block.

Furthermore, if a program for realizing the picture coding method and the picture decoding method as shown in the aforementioned embodiment are recorded on a recording medium such as a flexible disk, it becomes possible to easily perform the processing presented in the above embodiment in an independent computer system.

Figure 17A:
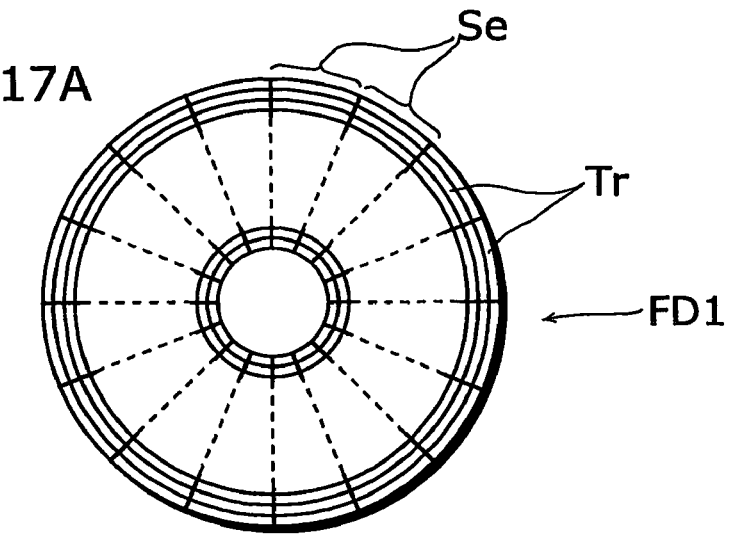
FIGS. 17A~17C are diagrams illustrating a recording medium that stores a program for realizing the picture coding method and the picture decoding method according to the above embodiment by a computer system.
Figure 17B:
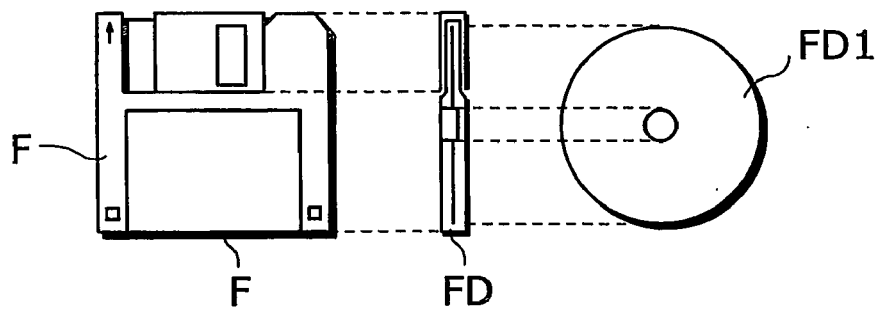
Figure 17C:
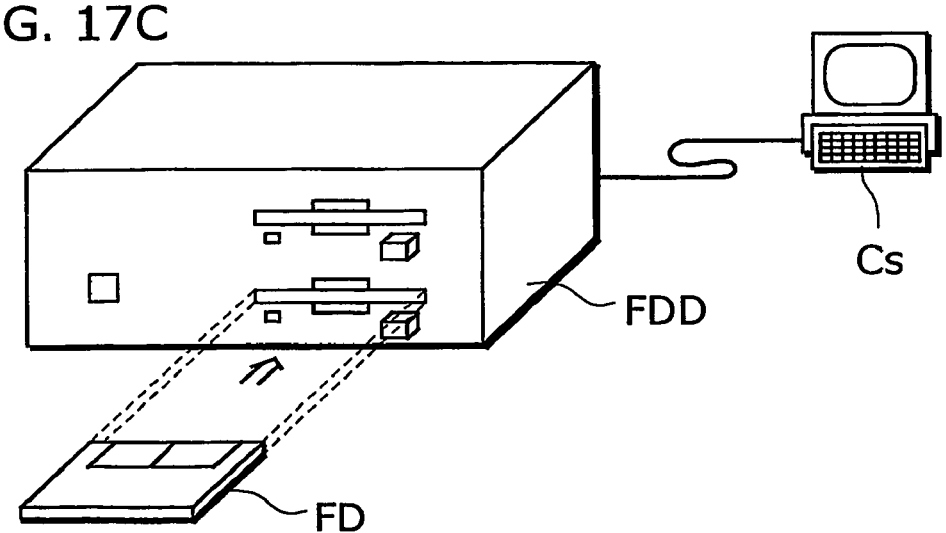

FIGS. 17A, 17B, and 17C are diagrams illustrating a recording medium that stores a program for realizing the picture coding method and the picture decoding method according to the aforementioned embodiment.

FIG. 17B shows an external view of a flexible disk viewed from the front, its schematic cross-sectional view, and the flexible disk itself, while FIG. 17A illustrates an example physical format of the flexible disk as a recording medium itself. The flexible disk FD is contained in a case F, and a plurality of tracks Tr are formed concentrically on the surface of the flexible disk FD in the radius direction from the periphery, each track being divided into 16 sectors Se in the angular direction. Therefore, in the flexible disk storing the above-mentioned program, the picture coding method and the picture decoding method as such program is recorded in an area allocated for it on the flexible disk FD.

Meanwhile, FIG. 17C shows the structure for recording and reading out the program on and from the flexible disk FD. When the program realizing the above picture coding method and picture decoding method is to be recorded onto the flexible disk FD, such program shall be written by the use of the computer system Cs via a flexible disk drive FDD. Meanwhile, when the picture coding method and the picture decoding method are to be constructed in the computer system Cs through the program on the flexible disk FD, the program shall be read out from the flexible disk FD via the flexible disk drive FDD and then transferred to the computer system Cs.

The above description is given on the assumption that a recording medium is a flexible disk, but an optical disc may also be used. In addition, the recording medium is not limited to this, and any other medium such as an IC card and a ROM cassette capable of recording a program can also be used.

The following describes application examples of the picture coding method and picture decoding method as shown in the above embodiment as well as a system using them.

FIG. 18 is a block diagram showing an overall configuration of a content supply system ex100 that realizes a content distribution service. The area for providing a communication service is divided into cells of desired size, and base stations ex107~ex110, which are fixed wireless stations, are placed in the respective cells.

In this content supply system ex100, devices such as a computer ex111, a PDA (Personal Digital Assistant) ex112, a camera ex113, a cellular phone ex114, and a camera-equipped cellular phone ex115 are respectively connected to the Internet ex101 via an Internet service provider ex102, a telephone network ex104, and the base stations ex107~ex110.

However, the content supply system ex100 is not limited to the combination as shown in FIG. 18, and may be connected to a combination of any of them. Also, each of the devices may be connected directly to the telephone network ex104, not via the base stations ex107~ex110, which are fixed wireless stations.

The camera ex113 is a device such as a digital video camera capable of shooting moving pictures. The cellular phone may be a cellular phone of a PDC (Personal Digital Communication) system, a CDMA (Code Division Multiple Access) system, a W-CDMA (Wideband-Code Division Multiple Access) system or a GSM (Global System for Mobile Communications) system, a PHS (Personal Handyphone system) or the like, and may be any one of these.

Furthermore, a streaming server ex103 is connected to the camera ex113 via the base station ex109 and the telephone network ex104, which enables live distribution or the like based on coded data transmitted by the user using the camera ex113. Either the camera ex113 or a server and the like capable of data transmission processing may code the shot data. Also, moving picture data shot by a camera ex116 may be transmitted to the streaming server ex103 via the computer ex111. The camera ex116 is a device such as a digital camera capable of shooting still pictures and moving pictures. In this case, either the camera ex116 or the computer ex111 may code the moving picture data. In this case, an LSI ex117 included in the computer ex111 or the camera ex116 performs coding processing. Note that software for coding and decoding may be integrated into a certain type of storage medium (such as a CD-ROM, a flexible disk and a hard disk) that is a recording medium readable by the computer ex111 and the like. Furthermore, the camera-equipped cellular phone ex115 may transmit the moving picture data. This moving picture data is data coded by an LSI included in the cellular phone ex115.

In this content supply system ex100, content (e.g. a music live video) which has been shot by the user using the camera ex113, the camera ex116 or the like is coded in the same manner as the above-described embodiment and transmitted to the streaming server ex103, and the streaming server ex103 makes stream distribution of the content data to clients at their request. The clients here include the computer ex111, the PDA ex112, the camera ex113, the cellular phone ex114 and so forth capable of decoding the above coded data. The content supply system ex100 with the above configuration is a system that enables the clients to receive and reproduce the coded data and realizes personal broadcasting by allowing them to receive, decode and reproduce the data in real time.

The picture coding apparatus and picture decoding apparatus presented in the above embodiment can be used for coding and decoding to be performed in each of the devices making up the above system.

An explanation is given of a cellular phone as an example.

Figure 19:
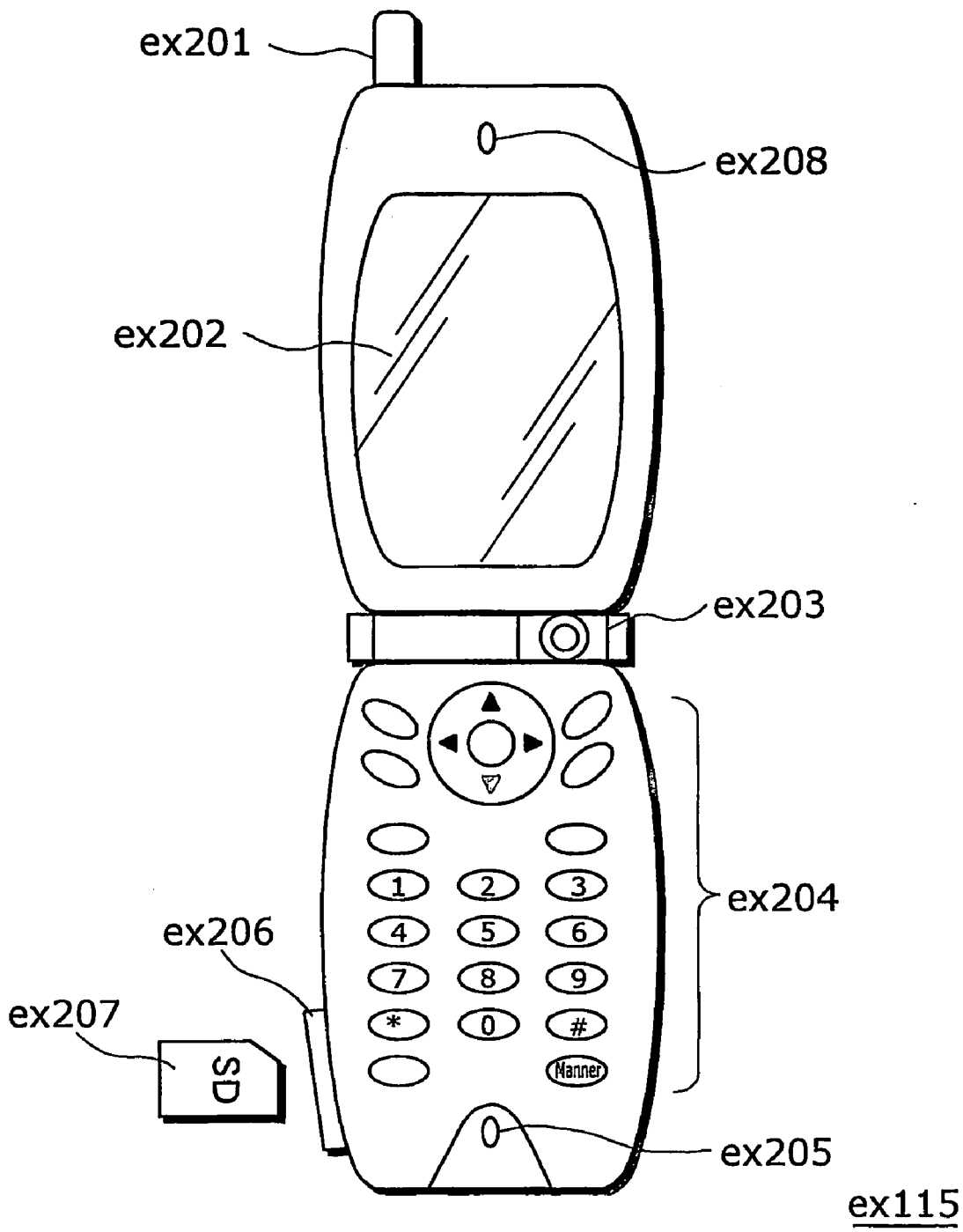
FIG. 19 is a diagram showing an external view of a cellular phone that employs the picture coding method and the picture decoding method.

FIG. 19 is a diagram showing the cellular phone ex115 that employs the picture coding method and the picture decoding method explained in the above embodiment. The cellular phone ex115 has an antenna ex201 for transmitting/receiving radio waves to and from the base station ex110, a camera unit ex203 such as a CCD camera capable of shooting video and still pictures, a display unit ex202 such as a liquid crystal display for displaying the data obtained by decoding video and the like shot by the camera unit ex203 and video and the like received by the antenna ex201, a main body equipped with a group of operation keys ex204, a voice output unit ex208 such as a speaker for outputting voices, a voice input unit ex205 such as a microphone for inputting voices, a recording medium ex207 for storing coded data or decoded data such as data of moving pictures or still pictures shot by the camera, data of received e-mails and moving picture data or still picture data, and a slot unit ex206 for enabling the recording medium ex207 to be attached to the cellular phone ex115. The recording medium ex207 is embodied as a flash memory element, a kind of EEPROM (Electrically Erasable and Programmable Read Only Memory) that is an electrically erasable and rewritable nonvolatile memory, stored in a plastic case such as an SD card.

Figure 20:
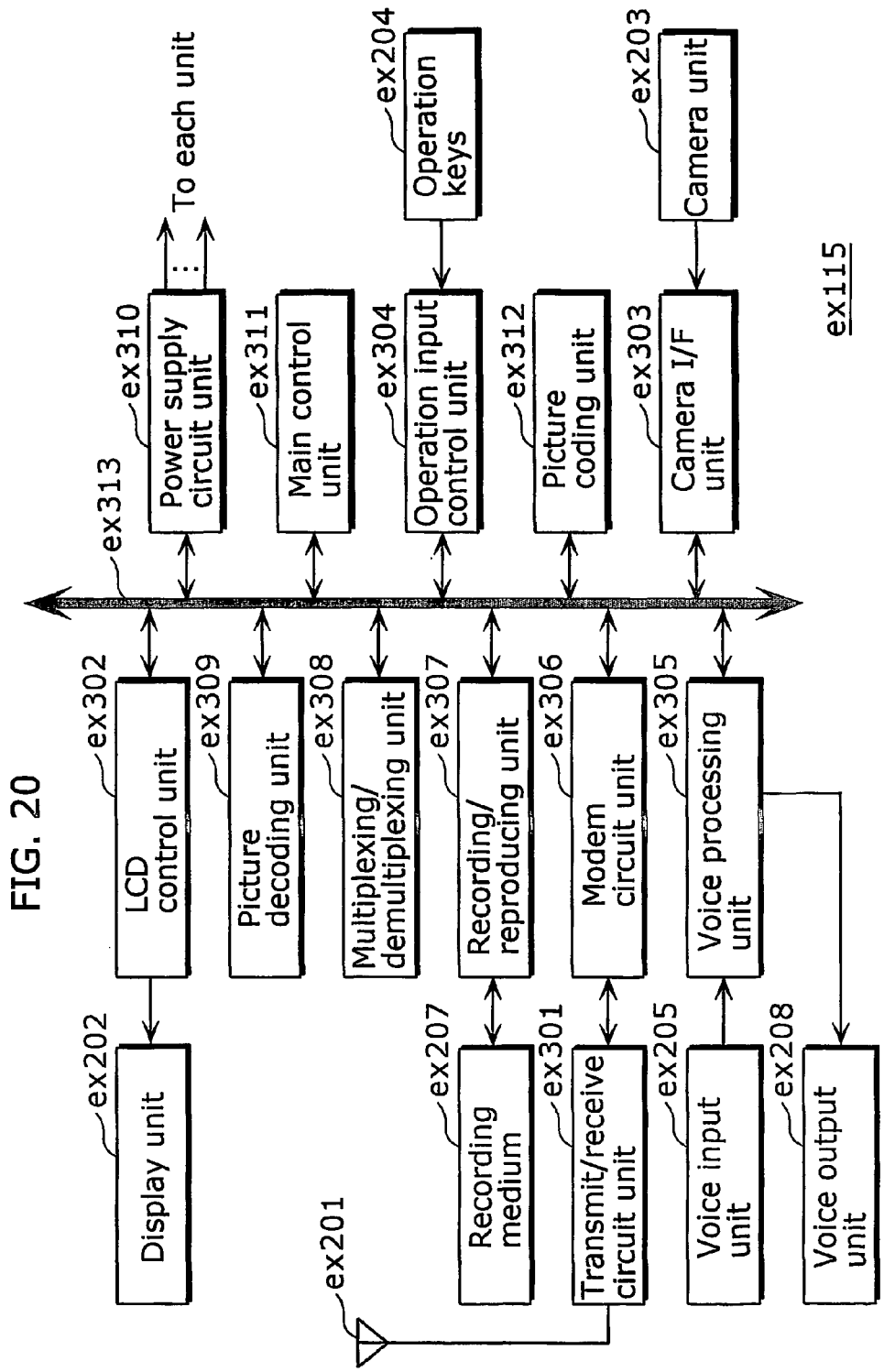
FIG. 20 is a block diagram showing a construction of the cellular phone.

Next, referring to FIG. 20, a description is given of the cellular phone ex115. In the cellular phone ex115, a main control unit ex311 for centrally controlling the display unit ex202 and each unit of the main body having the operation keys ex204 is configured in a manner in which a power supply circuit unit ex310, an operation input control unit ex304, a picture coding unit ex312, a camera interface unit ex303, an LCD (Liquid Crystal Display) control unit ex302, a picture decoding unit ex309, a multiplexing/demultiplexing unit ex308, a recording/reproducing unit ex307, a modem circuit unit ex306, and a voice processing unit ex305 are interconnected via a synchronous bus ex313.

When a call-end key or a power key is turned on by a user operation, the power supply circuit unit ex310 supplies each unit with power from a battery pack, and activates the camera-equipped digital cellular phone ex115 to make it into a ready state.

In the cellular phone ex115, the voice processing unit ex305 converts a voice signal received by the voice input unit ex205 in conversation mode into digital voice data under the control of the main control unit ex311 comprised of a CPU, a ROM, a RAM and others, the modem circuit unit ex306 performs spread spectrum processing on it, and a transmit/receive circuit unit ex301 performs digital-to-analog conversion processing and frequency transformation processing on the data, so as to transmit the resultant via the antenna ex201. Also, in the cellular phone ex115, data received by the antenna ex201 in conversation mode is amplified and performed of frequency transformation processing and analog-to-digital conversion processing, the modem circuit unit ex306 performs inverse spread spectrum processing on the resultant, and the voice processing unit ex305 converts it into analog voice data, so as to output it via the voice output unit ex208.

Furthermore, when sending an e-mail in data communication mode, text data of the e-mail inputted by operating the operation keys ex204 on the main body is sent out to the main control unit ex311 via the operation input control unit ex304. In the main control unit ex311, after the modem circuit unit ex306 performs spread spectrum processing on the text data and the transmit/receive circuit unit ex301 performs digital-to-analog conversion processing and frequency transformation processing on it, the resultant is transmitted to the base station ex310 via the antenna ex201.

When picture data is transmitted in data communication mode, the picture data shot by the camera unit ex203 is supplied to the picture coding unit ex312 via the camera interface unit ex303.

When picture data is not to be transmitted, it is also possible to display such picture data shot by the camera unit ex203 directly on the display unit ex202 via the camera interface unit ex303 and the LCD control unit ex302.

The picture coding unit ex312, which includes the picture coding apparatus according to the present invention, performs compression coding on the picture data supplied from the camera unit ex203 using the coding method employed by the picture coding apparatus presented in the above embodiment, so as to convert it into coded picture data, and sends it out to the multiplexing/demultiplexing unit ex308. At this time, the cellular phone ex115 sends voices received by the voice input unit ex205 while the shooting by the camera unit ex203 is taking place, to the multiplexing/demultiplexing unit ex308 as digital voice data via the voice processing unit ex305.

The multiplexing/demultiplexing unit ex308 multiplexes the coded picture data supplied from the picture coding unit ex312 and the voice data supplied from the voice processing unit ex305 using a predetermined method, the modem circuit unit ex306 performs spread spectrum processing on the resulting multiplexed data, and the transmit/receive circuit unit ex301 performs digital-to-analog conversion processing and frequency transformation processing on the resultant, so as to transmit the processed data via the antenna ex201.

When receiving, in data communication mode, moving picture file data which is linked to a Web page or the like, the modem circuit unit ex306 performs inverse spread spectrum processing on the received signal received from the base station ex110 via the antenna ex201, and sends out the resulting multiplexed data to the multiplexing/demultiplexing unit ex308.

In order to decode the multiplexed data received via the antenna ex201, the multiplexing/demultiplexing unit ex308 separates the multiplexed data into a coded bitstream of picture data and a coded bitstream of voice data, and supplies such coded picture data to the picture decoding unit ex309 and such voice data to the voice processing unit ex305 via the synchronous bus ex313.

Next, the picture decoding unit ex309, which includes the picture decoding apparatus according to the present invention, decodes the coded bitstream of the picture data using the decoding method paired with the coding method shown in the above-mentioned embodiment so as to generate moving picture data for reproduction, and supplies such data to the display unit ex202 via the LCD control unit ex302. Accordingly, moving picture data included in the moving picture file linked to a Web page, for instance, is displayed. At the same time, the voice processing unit ex305 converts the voice data into an analog voice signal, and then supplies this to the voice output unit ex208. Accordingly, voice data included in the moving picture file linked to a Web page, for instance, is reproduced.

Figure 21:
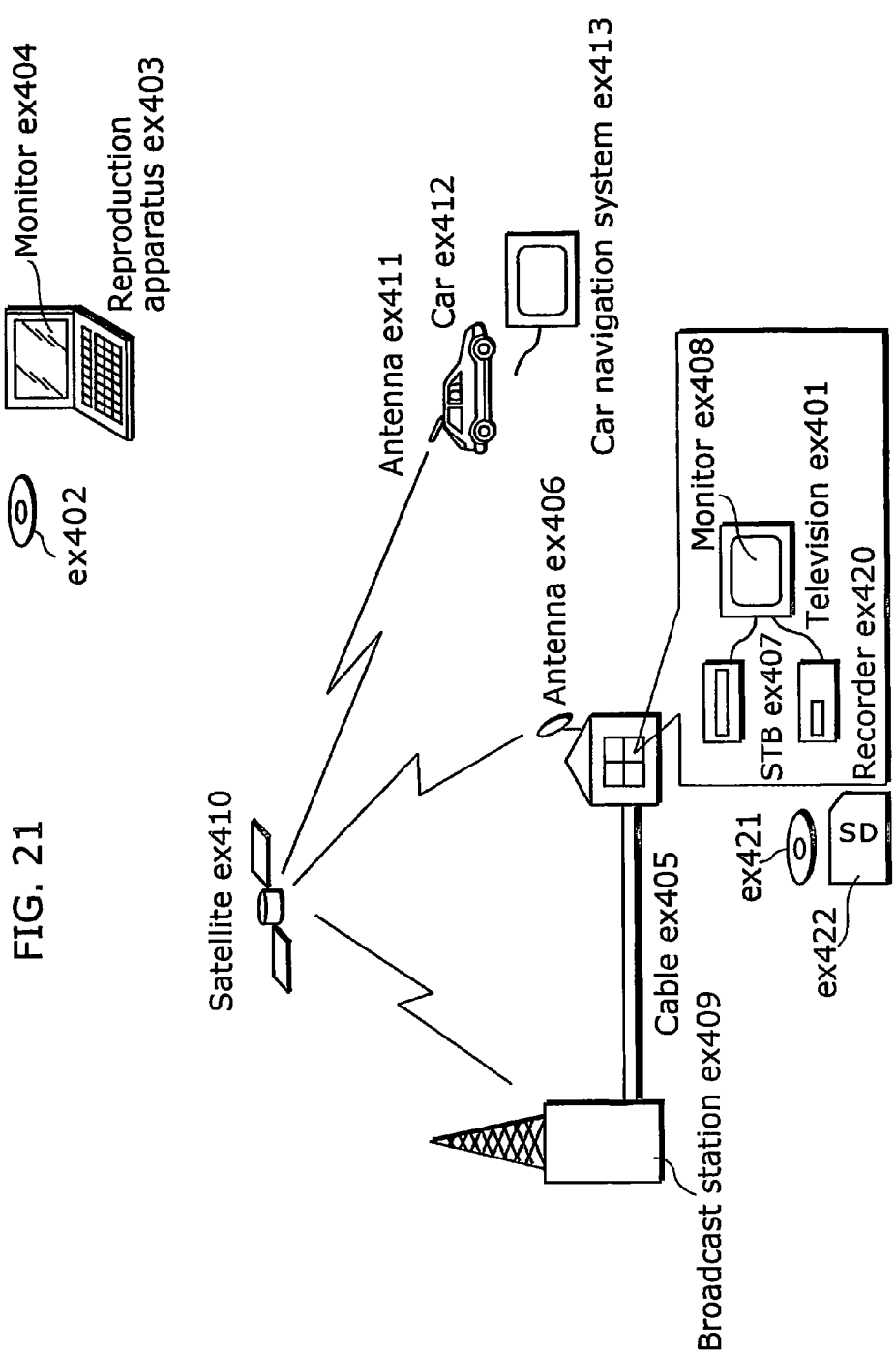
FIG. 21 is a diagram showing an overall configuration of a digital broadcasting system.

Note that the aforementioned system is not an exclusive example and therefore that at least either the picture coding apparatus or the picture decoding apparatus of the above embodiment can be incorporated into a digital broadcasting system as shown in FIG. 21, against the backdrop that satellite/terrestrial digital broadcasting has been a recent topic of conversation. To be more specific, at a broadcasting station ex409, a coded bitstream of video information is transmitted, by radio waves, to a satellite ex410 for communications or broadcasting. Upon receipt of it, the broadcast satellite ex410 transmits radio waves for broadcasting, an antenna ex406 of a house equipped with satellite broadcasting reception facilities receives such radio waves, and an apparatus such as a television (receiver) ex401 and a set top box (STP) ex407 decodes the coded bitstream and reproduces the decoded data. The picture decoding apparatus as shown in the above-mentioned embodiment can be implemented in the reproduction apparatus ex403 for reading and decoding the coded bitstream recorded on a storage medium ex402 that is a recording medium such as a CD and a DVD. In this case, a reproduced video signal is displayed on a monitor ex404. It is also conceivable that the picture decoding apparatus is implemented in the set top box ex407 connected to a cable ex405 for cable television or the antenna ex406 for satellite/terrestrial broadcasting so as to reproduce it on a television monitor ex408. In this case, the picture decoding apparatus may be incorporated into the television, not in the set top box. Or, a car ex412 with an antenna ex411 can receive a signal from the satellite ex410, the base station ex107 or the like, so as to reproduce a moving picture on a display device such as a car navigation system ex413 mounted on the car ex412.

Furthermore, it is also possible to code a picture signal by the picture coding apparatus presented in the above embodiment and to record the resultant in a recording medium. Examples include a DVD recorder for recording a picture signal on a DVD disc ex421 and a recorder ex420 such as a disc recorder for recording a picture signal on a hard disk. Moreover, a picture signal can also be recorded in an SD card ex422. If the recorder ex420 is equipped with the picture decoding apparatus presented in the above embodiment, it is possible to reproduce a picture signal recorded on the DVD disc ex421 or in the SD card ex422, and display it on the monitor ex408.

As the configuration of the car navigation system ex413, the configuration without the camera unit ex203 and the camera interface unit ex303, out of the configuration shown in FIG. 20, is conceivable. The same is applicable to the computer ex111, the television (receiver) ex401 and the like.

Concerning the terminals such as the cellular phone ex114, a transmitting/receiving terminal having both an encoder and a decoder, as well as a transmitting terminal only with an encoder, and a receiving terminal only with a decoder are possible as forms of implementation.

As stated above, it is possible to employ the picture coding method and the picture decoding method presented in the above embodiment into any one of the above-described devices and systems. Accordingly, it becomes possible to achieve an effect described in the aforementioned embodiment.

From the invention thus described, it will be obvious that the embodiment of the invention may be varied in many ways. Such variations are not to be regarded as a departure from the spirit and scope of the invention, and all such modifications as would be obvious to one skilled in the art are intended for inclusion within the scope of the following claims.

INDUSTRIAL APPLICABILITY

The present invention is suited for use as a picture coding apparatus for coding a picture on a block-by-block basis and a picture decoding apparatus, as well as a web server for distributing a moving picture, a network terminal for receiving such moving picture, a digital camera capable of recording and reproduction a moving picture, a camera-equipped cellular phone, a DVD recorder/player, a PDA, a personal computer, and the like.

The invention claimed is:

1. A decoding method for decoding a coded stream on a block-by block basis, comprising:
   obtaining, from the coded stream, information indicating whether an inverse orthogonal transformation size of a block on which inverse orthogonal transformation should be performed is a first size or a mixture of the first size and a second size, wherein the first size is smaller than the second size;
   deriving the inverse orthogonal transformation size of the block on which inverse orthogonal transformation should be performed, based on the information included in the coded stream;
   variable length decoding coded data included in the coded stream to obtain transform coefficients of each block;
   inverse quantizing the transform coefficients using a quantization matrix corresponding to the derived inverse orthogonal transformation size; and
   inverse orthogonal transforming the inverse quantized transform coefficients of each block, based on the derived inverse orthogonal transformation size;
   wherein, in the case where the size information indicates that the inverse orthogonal transformation size of the block on which inverse orthogonal transformation should be performed is a mixture of the first size and the second size and said deriving further includes deriving the inverse orthogonal transformation size based on a motion compensation block size, which is used to perform motion compensation on the block on which inverse orthogonal transformation should be performed, is smaller than the second size, a subsequent inverse orthogonal transforming is performed using only the first size as the inverse orthogonal transformation size.

2. The decoding method according to claim 1, wherein the size information is placed in each picture in the coded stream.

3. The decoding method according to claim 1, wherein the first size indicates a size of a block which is 4 pixels high and 4 pixels wide, and the second size indicates a size of a block which is 8 pixels high and 8 pixels wide.

* * * * *

UNITED STATES PATENT AND TRADEMARK OFFICE
CERTIFICATE OF CORRECTION

PATENT NO. : 8,081,678 B2
APPLICATION NO. : 10/546409
DATED : December 20, 2011
INVENTOR(S) : Lu et al.

Page 1 of 1

It is certified that error appears in the above-identified patent and that said Letters Patent is hereby corrected as shown below:

In Claim 1, Column 19, line 36, "block-by block" should be --block-by-block--.

Signed and Sealed this
Twenty-fourth Day of April, 2012

David J. Kappos
*Director of the United States Patent and Trademark Office*

UNITED STATES PATENT AND TRADEMARK OFFICE
CERTIFICATE OF CORRECTION

PATENT NO. : 8,081,678 B2
APPLICATION NO. : 10/546409
DATED : December 20, 2011
INVENTOR(S) : Lu et al.

It is certified that error appears in the above-identified patent and that said Letters Patent is hereby corrected as shown below:

On the Title page of the Patent

Item [60] Priority Data should read
Provisional Application No. 60/449,135, filed on February 21, 2003

Signed and Sealed this
Thirtieth Day of April, 2013

Teresa Stanek Rea
*Acting Director of the United States Patent and Trademark Office*